United States Patent
Bartel

(10) Patent No.: US 9,181,472 B2
(45) Date of Patent: Nov. 10, 2015

(54) MAGNESIUM-BASED COATINGS FOR NANOCRYSTALS

(75) Inventor: Joseph Bartel, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 1064 days.

(21) Appl. No.: 12/602,493

(22) PCT Filed: May 30, 2008

(86) PCT No.: PCT/US2008/065425
§ 371 (c)(1),
(2), (4) Date: Aug. 12, 2010

(87) PCT Pub. No.: WO2009/025913
PCT Pub. Date: Feb. 26, 2009

(65) Prior Publication Data
US 2010/0308271 A1 Dec. 9, 2010

Related U.S. Application Data

(60) Provisional application No. 60/941,211, filed on May 31, 2007.

(51) Int. Cl.
*C09K 11/56* (2006.01)
*C09K 11/02* (2006.01)
*C09K 11/88* (2006.01)

(52) U.S. Cl.
CPC ............. *C09K 11/025* (2013.01); *C09K 11/883* (2013.01)

(58) Field of Classification Search
CPC . C09K 11/0811; C09K 11/565; C09K 11/562
USPC ........ 252/301.6 R, 301.6 S, 301.4 R, 301.4 S
See application file for complete search history.

(56) References Cited

U.S. PATENT DOCUMENTS

| | | | |
|---|---|---|---|
| 6,319,426 B1 | 11/2001 | Bawendi et al. | |
| 6,426,513 B1 * | 7/2002 | Bawendi et al. | ................ 257/13 |
| 8,377,333 B2 * | 2/2013 | Ramprasad et al. | ... 252/301.4 R |
| 2003/0017264 A1 | 1/2003 | Treadway et al. | |
| 2005/0012182 A1 | 1/2005 | Jang et al. | |

FOREIGN PATENT DOCUMENTS

WO  WO-0247117     6/2002
WO  WO-2005/106082 11/2005

OTHER PUBLICATIONS

Dabbousi. (CdSe)ZnS Core-Shell Quantum Dots: Synthesis and Characterization of a Size Series of Highly Luminescent Nanocrystallites. J Phys Chem B 1997, 101, 9463-9475.*
Panin. Luminescence from ZnO/MgO nanoparticle structures prepared by solution techniques. Current Applied Physics 4 (2004) 647-650.*

(Continued)

*Primary Examiner* — Matthew E Hoban
(74) *Attorney, Agent, or Firm* — Life Technologies Corporation

(57) ABSTRACT

Semiconductor nanocrystal compositions comprising magnesium containing shells and methods of preparing them are described. The compositions provide strong emission in the blue and green wavelengths as well as chemical and photostability that have not been achieved with conventional shell materials.

30 Claims, 6 Drawing Sheets

(56) References Cited

OTHER PUBLICATIONS

Dabbousi. (CdSe)ZnS Core-Shell Quantum Dots: Synthesis and Characterization of a Size Series of Highly Luminescent Nanocrystallites. J. Phys. Chem. B 1997, 101, 9463-9475.*

Arians, R. et al., "Room Temperature Emission from CdSe/ZnSSe/MgS Single Quantum Dots", *Applied Physics Letters*, 90, 2007, 3.

Gust, A. et al., "Investigation of CdSe Quantum Dots in MgS Barriers as Active Region in Light Emitting Diodes", *Journal of Crystal Growth*, 301-302, 2007, 789-792.

Jain, F. et al., "Modeling of Transitions in Mn2+ doped ZnS Nanocrystals and Prediciting Reduced Lasing Threshold Current Density and Enhanced Electro-optic Effects in ZnCdSe—ZnMgSSe and InGaN—AlGaN Pseudomorphic Quantum Dots", *Journal of Applied Physics*, 85(5), 1999, 2706-2712.

Ledentsov, N. et al., "Quantum Dots Formed by Ultrathin Insertions in Wide-Gap Intrices", *Thin Solid Films*, 367, 2000, 40-47.

Prior, K. et al., "Characterization of MBE grown II-VI semiconductor thin layers by x-ray interference", *Journal of Crystal Growth*, vol. 251, 2003, pp. 565-570.

Renner, J. et al., "Whispering Gallery Modes in High Quality ZnSe/ZnMgSSe Microdisks with CdSe Quantum Dots Studied in Room Temperature", *Applied Physics Letter*, 89, 2006, 3.

Sedova, I. et al., "Integration of Cd(Zn)Se/ZnSe and GaN-based Lasers for Optoelectronic Applications in a Green Spectral Range", *Phys. Stat. Sol.* (c), 1: 4, 2004, 1030-1033.

Worz, M. et al., "Gap energies, exciton binding energies and band offsets in ternary ZnMgSe compounds and ZnSe/ZnMgSe heterostructures", *Phys. Stat. Sol.*, vol. 202, 1997, pp. 805-816.

U.S. Appl. No. 08/065,425, "International Search Report mailed May 29, 2009", 15 pgs.

U.S. Appl. No. 08/065,425, "PCT International Preliminary Report on Patentability", Dec. 1, 2009, 9 pgs.

* cited by examiner

MAGNESIUM-BASED COATINGS FOR NANOCRYSTALS

CROSS-REFERENCE TO RELATED APPLICATIONS

This application is a 371 of PCT/US2008/065425, filed May 30, 2008, which claims priority to U.S. Provisional Application Ser. No. 60/941,211, filed May 31, 2007, which are expressly incorporated herein by reference in their entireties.

FIELD OF THE INVENTION

The invention relates to semiconductor nanocrystals comprising a core and a magnesium-containing layer.

DESCRIPTION OF RELATED ART

Semiconductor nanocrystals are important new materials that have a wide variety of applications. Of the many unique properties of these materials, the photophysical characteristics may be the most useful. Specifically, these materials can display intense luminescent emission that is particle size-dependent and particle composition-dependent, can have an extremely narrow luminescence bandwidth, can be environmentally insensitive, and are resistant to photobleaching under intensive light sources. Emissions can be efficiently excited with electromagnetic radiation having a shorter wavelength than the highest energy emitter in the material. These properties allow for the use of semiconductor nanocrystals as, for example, ultra-sensitive luminescent reporters of biological states and processes in highly multiplexed systems.

Nanocrystal cores have been broadly studied and improvements in synthesis have lead to the optimization of key physiochemical properties resulting in nanocrystal cores with uniform size distributions and intense, narrow emission bands following photo-excitation. However, nanocrystal cores alone lack sufficiently intense or stable emission intensities for most applications, and nanocrystal cores are particularly sensitive to their environment; for example, the aqueous environment required for many biological applications can lead to the complete destruction of the luminescence of nanocrystal cores. Thus methods to photostabilize nanocrystal cores (e.g., protect their luminescent properties) and make them stable and useful in aqueous media are of great interest for biological applications.

The ability to coat nanocrystal cores has been an area of much research, and coating nanocrystal cores with an inorganic shell to form "core/shell nanocrystals", has resulted in improved emission intensity, chemical and photochemical stability, reduced self-quenching characteristics, stability in a variety of environments, and the like. The impact of coating nanocrystal cores with an inorganic shell on underlying luminescence energies is not well understood and is generally controlled based on a small set of criteria such as, for example, the choice of the coating material and the density and thickness of the shell. Optionally, an organic or other overcoat that is selected to provide compatibility with a dispersion medium may surround the shell.

An inorganic shell is generally thought to passivate the outermost surface of a core nanocrystal thereby reducing or eliminating the surface energy states associated with the core and insulating the core from the outside environment. This can reduce or eliminate the nonradiative loss of excitons from the core to the environment. Photochemical degradation may, therefore, be reduced, and emissions efficiency and stability may be improved by coating a core with an inorganic shell.

The choice of shell material largely depends on the core material. For example, the shell material may generally have a wider band gap than the core, and the shell may be chosen to have an atomic spacing and lattice structure that closely match those of the core material. Core/shell nanocrystals having a CdX core wherein X is S, Se, or Te coated with a YZ shell where Y is Cd or Zn, and Z is S, Se, or Te are commonly produced and used and have been shown to have good emissions characteristics and stability. This may largely be due to the YZ coating material's band-gap energy which spans that of the core relatively symmetrically. 'Symmetry' as used in this sense means that the wider bandgap of the shell material fully encompasses the narrower bandgap of the core material and extends both above the high end of the core material's bandgap and below the low end of the core material's bandgap. For example, FIGS. 1 and 2 show the band gap alignments for CdSe cores with CdS or ZnS shells. Both CdS and ZnS span the CdSe band gap, but ZnS spans CdSe more symmetrically, extending both above the high end of the CdSe bandgap and below the low end of the CdSe bandgap. Therefore, a CdSe/ZnS core/shell nanocrystals may have better properties than a CdSe/CdS nanocrystal since the symmetry of the band gap alignment may better insulate the core from the surrounding environment.

It must also be recognized that the bandgaps for each of these materials is a value measured for the bulk material rather than for a nanocrystal comprised of that material. The bandgap for a material is known to change as the size of the sample of the material changes—that is an underlying basis for the uniquely valuable fluorescence properties of nanocrystals, for example. It is not well understood how the bandgaps of various materials or mixtures of materials are affected as the sample approaches nanocrystal dimensions. In particular, a thin layer of a semiconductor material forming a shell on a nanocrystal may not have bandgap properties that are predictable relative to its bulk properties. Thus, while the bulk material properties can be useful to explain why certain pairs of materials work well, they may not be reliable for predicting which pairings will work well.

One limitation of CdSe-based core/shell nanocrystals is that the blue emitting particles have lower extinction coefficients than red emitting particles. This is due to the fact that emission wavelength are tuned by changing the CdSe core particle size. Several researchers have shown that by utilizing alloy cores (e.g., CdSSe or ZnCdSe) one can tune the wavelength by adjusting the elemental composition rather than size and decouple emission color from extinction coefficient. One can also utilize a semiconductor material with a larger bulk band gap such that the largest nanocrystals emit in the blue/green (e.g., ZnSe).

Nanocrystal cores have limited utility without passivation with an inorganic shell. ZnSe or ZnCdSe cores, while having advantageous fluorescence properties, have proven to be much more difficult to coat and passivate than CdSe cores. The failure to passivate these cores is primarily due to their inherently high conduction band energy. As illustrated in FIGS. 3 and 4, the band gap energy of ZnSe core does not align well with either CdS or ZnS. Even though ZnS may span the core band gap better, it is not symmetrical—it does not extend much above the high end of the ZnSe bandgap. In fact, the band gap misalignment of ZnSe and ZnS semiconductor material is so severe when these materials are reduced into a nanocrystal size, that even when coated with several monolayers of ZnS the emissions intensity of ZnSe/ZnS is rapidly lost when exposed to oxygen.

Thus, there exists a need for materials and methods suitable to form a passivating shell over nanocrystal cores with high conduction bands (e.g., ZnSe cores).

Many patents and publications exist relating to semiconductor nanocrystals. The following is a small selection of those available in the field relating to magnesium-containing nanocrystals.

A publication by Hee Son, D. et al. (Science 306: 1009-1012 (2004)) describes cationic exchange reactions in ionic nanocrystals. CdSe nanocrystals were reacted with $Ag^+$ ions to yield $Ag_2Se$ nanocrystals. The authors reported surprising speed and reversibility of the reaction at room temperature.

U.S. Pat. No. 5,537,000 (issued Jul. 16, 1996) describes monolayers of semiconductor nanocrystals. A list of suitable semiconductor materials is presented, including MgS, MgSe, and MgTe.

U.S. Pat. No. 6,306,610 (issued Oct. 23, 2001) offers fluorescent semiconductor nanocrystals associated to a compound. In discussing the nanocrystals, a long list of core and shell materials is disclosed including MgS, MgSe, and MgTe.

U.S. Pat. No. 6,379,622 (issued Apr. 30, 2002) describes a device for detecting the presence of analyte in a sample. The device contains a binding substrate, a labeled analogue, a dye bound to the binding substrate, a first reference containing quantum dots that emit light at a second wavelength when irradiated, an analyte-permeable membrane, and a void volume. In discussing the quantum dots, a long list of semiconductor materials are listed, including MgS, MgSe, and MgTe.

U.S. Pat. Nos. 6,444,143 (issued Sep. 3, 2002), 6,251,303 (issued Jun. 26, 2001), and 6,319,426 (issued Nov. 20, 2001), and 6,426,513 (issued Jul. 30, 2002) offer semiconductor nanocrystals coated with various materials. Overcoating layers containing ZnS, GaN, or magnesium chalcogenides such as MgS, MgSe and MgTe are suggested.

U.S. Pat. No. 6,500,622 (issued Dec. 31, 2002) describes the use of semiconductor nanocrystals in bead-based nucleic acid assays. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 6,602,671 (issued Aug. 5, 2003) offers semiconductor nanocrystals for fluid dynamics, microfluidics, identification of objects, encoding combinatorial libraries, and genomics applications. In describing the nanocrystals, overcoating layers containing ZnS, GaN, or magnesium chalcogenides such as MgS, MgSe and MgTe are suggested.

U.S. Pat. No. 6,630,307 (issued Oct. 7, 2003) provides methods of detecting target analytes in samples. In discussing shelled nanocrystals for use in the methods, a material that has a bandgap energy in the ultraviolet is suggested, for example ZnS, GaN, and magnesium chalcogenides such as MgS, MgSe, and MgTe.

U.S. Pat. No. 6,645,444 (issued Nov. 11, 2003) describes methods for the preparation of metal nanocrystals. Metal ions are complexed with organic ligands, and reduced to form nanocrystals. Magnesium is among the long list of metallic elements suggested as suitable for forming nanocrystals.

U.S. Pat. No. 6,653,080 (issued Nov. 23, 2003) describes loop probe hybridization assays for polynucleotide analysis using semiconductor nanocrystals. In discussing the nanocrystal shells, a material that has a bandgap energy in the ultraviolet is suggested, for example ZnS, GaN, and magnesium chalcogenides such as MgS, MgSe, and MgTe.

U.S. Pat. Nos. 6,423,551 (issued Jul. 23, 2002) and 6,699,723 (issued Mar. 2, 2004) offer core-shell nanocrystals with attached linking groups. A list of semiconductor materials includes MgS, MgSe, and MgTe.

U.S. Pat. No. 6,921,496 (issued Jul. 26, 2005) suggests ionic conjugates of fusion proteins and semiconductor nanocrystals. The nanocrystals can have the formula MX; where M is cadmium, zinc, magnesium, mercury, aluminum, gallium, indium or thallium.

U.S. Pat. No. 6,734,420 (issued May 11, 2004) offers a spectral bar code system using semiconductor nanocrystals. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 6,759,235 (issued Jul. 6, 2004) offers two-dimensional spectral imaging systems using semiconductor nanocrystals. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 6,774,361 (issued) describes methods of identifying items labeled with semiconductor nanocrystals. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 6,819,692 (issued Nov. 16, 2004) describes a laser and gain media. The gain media contains a plurality of semiconductor nanocrystals of formula MX; where M is cadmium, zinc, magnesium, mercury, aluminum, gallium, indium or thallium.

U.S. Pat. Nos. 6,821,337 (issued Nov. 23, 2004) and 7,138,098 (issued Nov. 21, 2006) offer a method of synthesizing a nanocrystal by combining a metal-containing non-organometallic compound, a coordinating solvent, and a chalcogen source to form a nanocrystal. Magnesium is one of several metals listed.

U.S. Pat. No. 6,838,243 (issued Jan. 4, 2005) describes polynucleotide analysis using generic capture sequences. Semiconductor nanocrystals are used as at least one label in the methods. In discussing shelled nanocrystals, a material that has a bandgap energy in the ultraviolet is suggested, for example ZnS, GaN, and magnesium chalcogenides such as MgS, MgSe, and MgTe.

U.S. Pat. No. 7,068,898 (issued Jun. 27, 2006) describes composites of a matrix and nanostructures. In discussing shelled nanostructures, a material that has a bandgap energy in the ultraviolet is suggested, for example ZnS, GaN, and magnesium chalcogenides such as MgS, MgSe, and MgTe.

U.S. Pat. No. 7,079,241 (issued Jul. 18, 2006) describes spatial positioning of spectrally labeled beads. In discussing shelled nanocrystals, a material that has a bandgap energy in the ultraviolet is suggested, for example ZnS, GaN, and magnesium chalcogenides such as MgS, MgSe, and MgTe.

U.S. Pat. No. 7,108,915 (issued Sep. 19, 2006) offers water-dispersible nanocrystals prepared by applying a coating of a multiply amphipathic dispersant to the surface of a hydrophobic nanocrystal. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 7,129,048 (issued Oct. 31, 2006) describes loop probe hybridization assays for polynucleotide analysis using semiconductor nanocrystals. In discussing the nanocrystal shells, a material that has a bandgap energy in the ultraviolet is suggested, for example ZnS, GaN, and magnesium chalcogenides such as MgS, MgSe, and MgTe.

U.S. Pat. No. 7,150,910 (issued Dec. 19, 2006) describes a grating having a semiconductor nanocrystal layer. The nanocrystals can have the formula MX, where M is cadmium, zinc, magnesium, mercury, aluminum, gallium, indium, thallium, or mixtures thereof.

SUMMARY

Provided herein are compositions and methods that address certain significant limitations of conventional CdSe core-based nanocrystals. In some embodiments, provided herein are nanocrystals comprising Zn-containing cores along with shells that successfully improve or protect the core's luminescence properties. In some embodiments, the improved nanocrystals provide greater luminescent intensity than conventional CdSe core nanocrystals having the same maximum emission wavelength. In some embodiments, the improved nanocrystals also provide enhanced photostability and/or chemical stability relative to conventional CdSe core nanocrystals. Methods for making nanocrystals having such improved properties are also provided, including methods that minimize concerns about matching lattice spacing of the shell with the underlying core. The disclosed nanocrystals have improved photostability and intensity relative to conventional nanocrystals having CdSe cores, and they can be made across a wider color range than nanocrystals known in the art while maintaining high luminescent intensity and suitable photostability.

Because emission wavelengths of CdSe core based nanocrystals are tuned by changing the particle size, smaller particles that fall into the blue and green sections of the visible spectrum have lower extinction coefficients. This leads to conventional nanocrystals having blue and green emitting nanocrystals that have relatively weak emission compared to the red emitting nanocrystals. Due to this limitation, alloys such as CdSSe and ZnCdSe and wider band gap semiconductors (e.g., ZnSe) have been explored. Although these materials address the problem of weakly emitting blue/green CdSe cores, passivation of these alternative cores has proven difficult. Thus, while providing brighter and more easily detectable luminescence responses, these alternative cores have generally been less stable useful than those with CdSe cores, which have received most of the attention in this field.

Cores have limited utility compared to core/shells due to poor chemical and photostability of unprotected cores. When a bare core nanocrystal is excited into a state where the nanocrystal has a 'separated' hole and electron, it is too reactive toward common species like oxygen. It thus rapidly gets damaged or degraded when illumination puts it into an excited state. A shell applied over the core can be effective to protect or passivate the core nanocrystal, provided it effectively insulates the core from the external environment.

However, while suitable shell or passivation layers for use with CdSe nanocrystal cores may be known, the selection and application of a suitable passivating layer on other types of nanocrystal cores can be difficult. The passivation difficulty is believed to arise from the fact that most non-cadmium based semiconductors have high conduction bands relative to cadmium based semiconductors. These materials, when photoexcited, leave the excited electron vulnerable to oxidative quenching even when covered with passivation layer or shell materials like ZnS and CdS that would be suitable for use on a CdSe core.

Provided herein are compositions that not only provide strong emission in the blue and green wavelengths, but also provide greater chemical and/or photostability than has been achieved with conventional shell materials (e.g., ZnS, ZnSe, CdS). Nanocrystals provided herein having blue, green or blue-green emission bands and brightness that are significantly enhanced relative to conventional CdSe core nanocrystals are therefore an aspect of the invention. Thus, in some embodiments, provided here are nanocrystals having comparable photostability to a nanocrystal comprising a CdSe core and ZnS shell, for example, while providing more intense luminescence which makes it easier to detect. FIGS. 10, 11 and 12 herein demonstrate that nanocrystals of the invention provide greater fluorescence intensities than a commercialized quantum dot known as Qdot 525, and that they also retain high levels of photostability; while the same core without the shells of the present invention had much lower photostability.

Additionally, provided herein are methods for incorporating magnesium into a previously deposited inorganic shell on a core/shell nanocrystal, and methods for using magnesium treatments to enhance the photostability of a nanocrystal. These methods overcome several previously unforeseen difficulties that were encountered in attempting to deposit MgX shells directly on cores by traditional colloidal synthetic techniques; the methods of the invention should be applicable to the modification of any core/shell nanocrystal.

In one aspect, provided herein is a bright nanocrystal comprising a core and a shell, wherein the bright nanocrystal:
  a) has a characteristic fluorescence emission wavelength in the visible range,
  b) is photostable, and
  c) provides fluorescence intensity that is at least about twice the fluorescence intensity of a conventional nanocrystal having a CdSe core that is sized to have the same emission wavelength as the bright nanocrystal.

The bright nanocrystal may have a characteristic fluorescence emission wavelength of between about 400 nm and about 600 nm. In some embodiments, this wavelength is between 450 and 550, or between 500 and 550 nm.

In some embodiments, the bright nanocrystal has a core that comprises Zn. In some embodiments, it has a shell that comprises Mg.

In another aspect, provided here are nanocrystals that include a core that comprises Zn and a shell that comprises Mg. In some embodiments, the shell comprises both Mg and Zn. In some embodiments, the core comprises ZnSe or ZnCdSe. In some embodiments, the core comprises or consists essentially of ZnCdSe, and the ratio of Zn to Cd is between about 0.1 and about 0.3.

In certain embodiments of the above nanocrystals, the shell comprises ZnS. In certain embodiments, the shell comprises MgS. In some embodiments, it comprises both MgS and ZnS.

In some of the foregoing embodiments, the core of the nanocrystal consists essentially of ZnCdSe. In other of the foregoing embodiments, the core of the nanocrystal consists essentially of ZnSe. In some of these embodiments, the shell of the nanocrystal consists essentially of a mixture of MgS and ZnS. Other materials may be present on the shell in such embodiments.

In some embodiments, the amount of MgS in the shell is sufficient to increase the photostability of the nanocrystal relative to an otherwise identical nanocrystal that does not contain magnesium in its shell. In some embodiments, the amount of MgS is sufficient to provide a nanocrystal that loses less than 10% of its fluorescence intensity under irradiation conditions where an otherwise identical nanocrystal that does not contain magnesium in its shell loses at least 20% of its fluorescence intensity. In some embodiments, the amount of MgS is sufficient to provide a nanocrystal that loses less than 10% of its fluorescence intensity under irradiation conditions where an otherwise identical nanocrystal that does not contain magnesium in its shell loses at least 40% of its fluorescence intensity.

In some embodiments, provided herein is a nanocrystal that comprises a $Zn_xCd_{1-x}Se$ core, where x is between 0.1 and 0.9, and a shell comprising $Mg_yZn_{1-y}S$, where y is at least about 0.1. In some embodiments, y is selected to provide enough MgS to form a monolayer on the surface of the core of the nanocrystal. In some embodiments of these nanocrystals that comprise a $Zn_xCd_{1-x}Se$ core, the nanocrystal has a characteristic fluorescence maximum wavelength in the blue or green portion of the visible spectrum. Preferably, such nanocrystals are photostable. In some embodiments, x is greater than 0.15 or greater than 0.25. In some embodiments, x is 0.5 or greater. In some embodiments, x is at least 0.7.

In another aspect, provided herein are methods to make a photostable nanocrystal, or to increase the photostability of a nanocrystal An exemplary method comprises the steps of:
i) providing a first core/shell nanocrystal;
ii) dispersing the nanocrystal in a reaction mixture containing a magnesium material; and
iii) heating the reaction mixture with the nanocrystal to a temperature of at least about 120° C.;
to produce a photostable nanocrystal having better photostability than the first core/shell nanocrystal.

In some embodiments, the methods provide a photostabilized nanocrystal that loses less than 10% of its initial emission intensity under conditions where the first core/shell nanocrystal would lose 20% of its initial emission intensity. In some embodiments, the methods provide a photostable nanocrystal that loses less than 10% of its initial emission intensity under conditions where the first core/shell nanocrystal would lose 40% of its initial emission intensity.

In some embodiments, these methods use a reaction mixture that comprises an alkylphosphinic acid, a trialkylphosphine, or a trialkylphosphine oxide, or a mixture of at least two of these materials. The trailkylphosphine is often utilized as a medium for conducting the reaction. In some embodiments, it is trioctylphosphine.

For the exemplary methods, the core of the first core/shell used sometimes comprises ZnSe, or consists essentially of. In other embodiments, the core of the first core/shell comprises ZnCdSe, or it consists essentially of ZnCdSe. As used herein, ZnCdSe indicates that Zn and Cd are both present, and frequently Zn represents about 15-95% of the metal (Zn+Cd) present, while the balance is Cd. In one embodiment, Zn represents about 50% of the metal and about 50% is Cd. In other embodiments, the ratio of Zn to Cd is greater than 1. In other embodiments, the ratio is about 2, and in other embodiments, the ratio is about 5 or greater than about 5.

In some embodiments, the methods disclosed herein are used to increase photostability of a nanocrystal having an amount of Cd in the core that is sufficient to provide a core having a largest dimension of about 6 nm and a fluorescence color in the blue or green region of the visible spectrum. In some embodiments, the core has an amount of Cd in the core that is sufficient to provide a core having a largest dimension of about 6 nm and a fluorescence emission maximum at a wavelength above 500 nm.

In some embodiments of the foregoing methods, the shell of the first core/shell nanocrystal comprise ZnS.

In the above methods any suitable magnesium material can be used. In some embodiments, a magnesium material identified herein is used. In some embodiments, the magnesium material is a magnesium alkylcarboxylate. In certain embodiments, it is magnesium acetate.

In some embodiments, the method uses a reaction mixture which, in addition to a magnesium material, comprises at least one of the following materials: a trialkylphosphine, a trialkylphosphine oxide, an alkylamine, or an alkylphosphinic acid. An alkylphosphinic acid may be present in some embodiments, sometimes along with an alkylamine. In some embodiments, a trialkylphosphine is used as the medium or solvent for the reaction. In certain embodiments, the mixture comprises trioctylphosphine.

The methods typically include heating the nanocrystal in the reaction mixture. In some embodiments of the foregoing methods, the step of heating the reaction mixture with the nanocrystal comprises heating the mixture to a temperature between about 150° C. and about 250° C. In some embodiments, the step of heating the reaction mixture with the nanocrystal comprises heating the mixture for between about 0.5 hr and about 4 hr.

In another aspect, the invention provides a photostable nanocrystal, or a photostabilized nanocrystal, made by the foregoing methods.

In another aspect, provided herein is a nanocrystal that comprises a semiconductor core and a shell, wherein the shell comprises Mg. The amount of magnesium present can vary; typically, the amount of magnesium is an amount that is sufficient to increase the photostability of the nanocrystal relative to an otherwise identical nanocrystal prepared without magnesium.

Other aspects and embodiments are described below.

DESCRIPTION OF THE FIGURES

The following figures form part of the present specification and are included to further demonstrate certain aspects of the present inventions. The inventions may be better understood by reference to one or more of these figures in combination with the detailed description of specific embodiments presented herein.

FIGS. 3 and 4 show that CdS would not make a good shell for a ZnSe core, and ZnS may be a poor choice, also, judging solely from the bandgap information.

DETAILED DESCRIPTION OF THE INVENTION

Disclosed herein are methods and materials that provide an effective shell layer on a Zn-containing nanocrystal core, which has been difficult to achieve until now, and increases photostability of the nanocrystal. Without being bound by theory, the disclosed methods and materials apparently achieve increased photostability by providing a shell with a suitable bandgap to extend symmetrically beyond the bandgap of a Zn-containing nanocrystal core such as $Zn_xCd_{1-x}Se$ where x is at least about 0.25 or at least about 0.5, for example, and thus insulate the core from the external environment on both the high and low ends of the core's bandgap.

Figure 5:
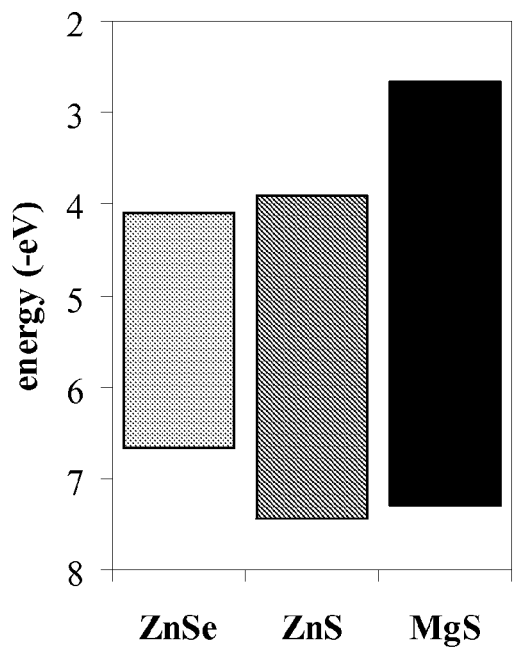
FIG. 5 shows the band gap energy diagram of ZnSe versus ZnS and MgS semiconductive material. The bandgap comparison suggests that MgS might make a better shell for a ZnSe core than ZnS would.
Figure 8:
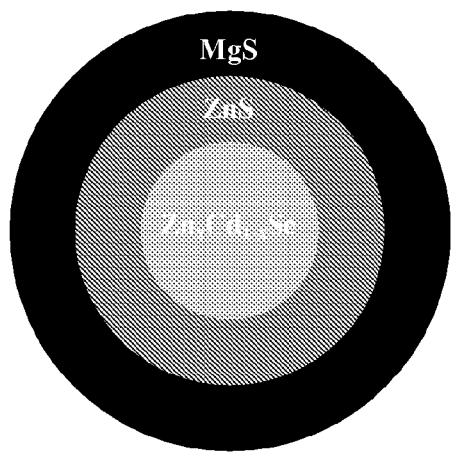
FIG. 8 is a drawing that depicts a ZnCdSe core overcoated with a ZnS shell first shell and a MgS shell second. This depicts a core having a ZnS shell applied, followed by a MgS shell.
Figure 9:
FIG. 9 is a drawing that depicts a ZnCdSe core overcoated with a shell that is a mixture of Zn, Mg and S. This shell could be homogeneous, or it could contain a gradient having a Zn/Mg ratio that either increases or decreases when moving outward from the core through the shell layer.
Figure 10:
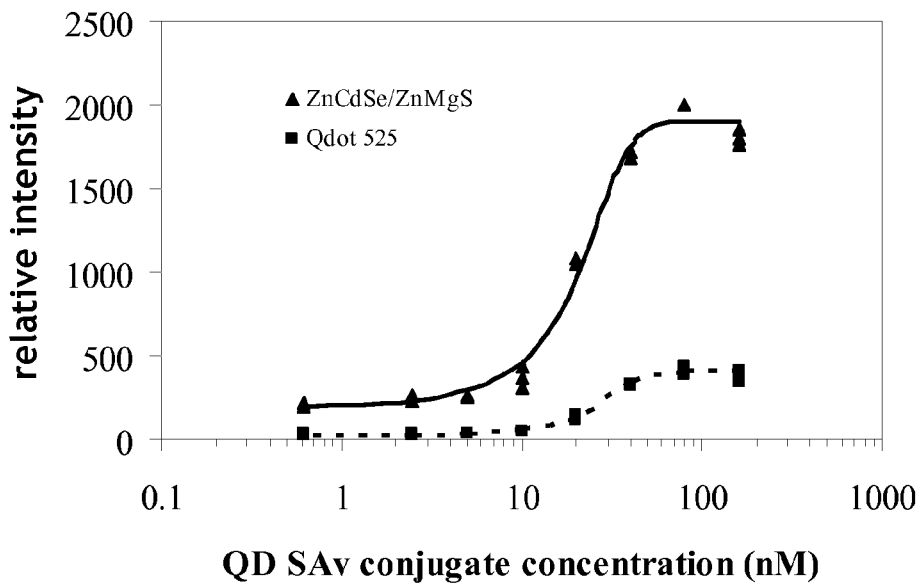
FIG. 10 shows the relative emission intensity of two streptavidin conjugates titrated against immobilized biotin. Qdot 525 is a popular commercial quantum dot having an emission maximum at 525 nm, used as a standard. The ZnCdSe/ZnMgS is a nanocrystal of the invention having a core containing mainly Zn and a shell that contains Mg, and has a substantially higher luminescence intensity than the commercial standard emitting at the same maximal wavelength.
Figure 11:
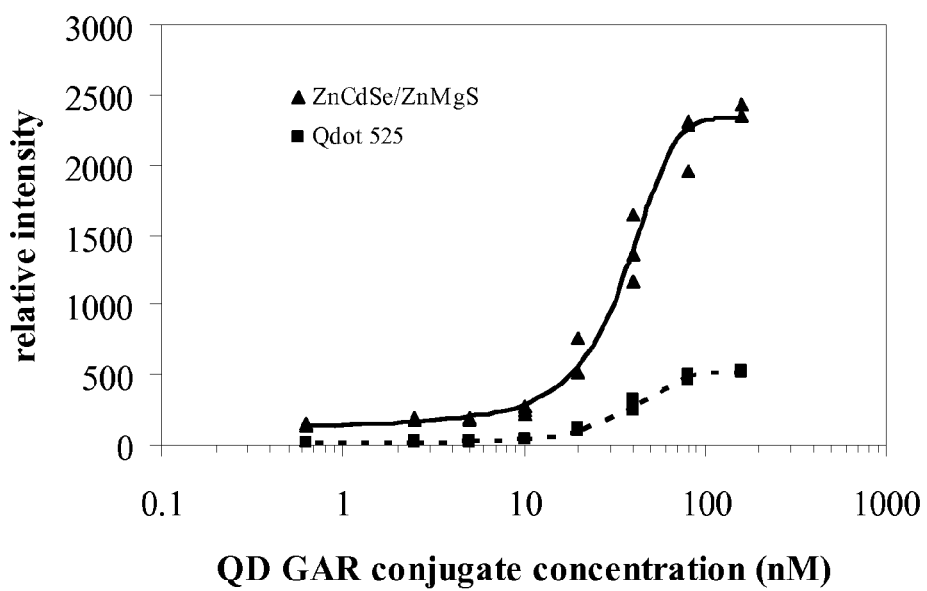
FIG. 11 shows the relative emission intensity of two goat anti-rabbit conjugates titrated against immobilized rabbit antibody. Qdot 525 is a popular commercial quantum dot having an emission maximum at 525 nm, used as a standard. The ZnCdSe/ZnMgS is a nanocrystal of the invention having a core containing mainly Zn and a shell that contains Mg, and has a substantially higher luminescence intensity than the commercial standard emitting at the same maximal wavelength.
Figure 12:
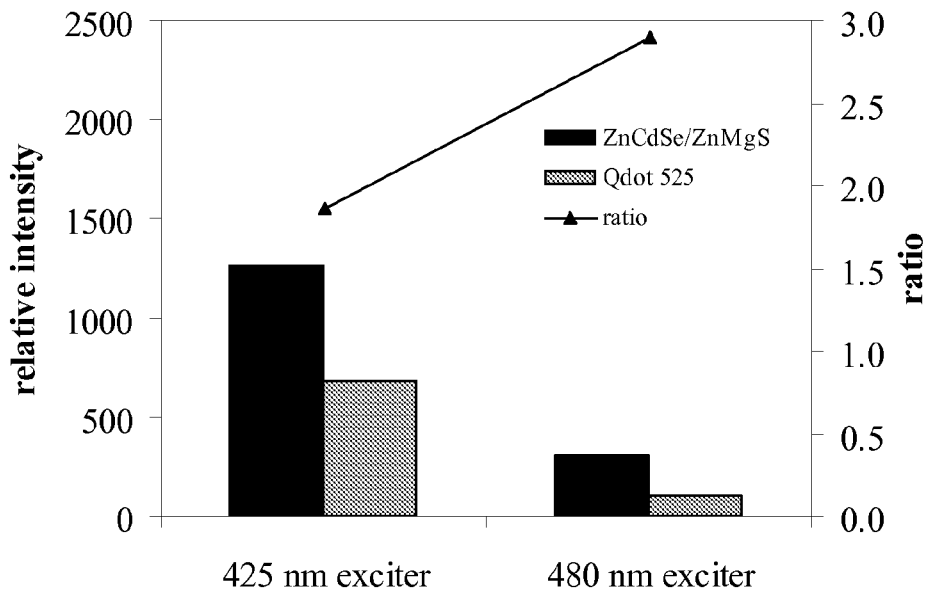
FIG. 12 shows the relative emission intensity from fixed HEp-2 cells incubated with rabbit anti-Ki67 antibody followed by incubation with goat anti rabbit quantum dot conjugates. The relative emission intensity is shown for two excitation wavelengths—480 nm was used because it is a widely available excitation wavelength because it is used for fluorescein dyes, while 425 nm was used because it is optimal for the ZnCdSe core. Note that the ZnCdSe/ZnMgS nanocrystal of the invention has much higher fluorescence emission than the Qdot 525 standard at both wavelengths.

In one embodiment (exemplified in FIGS. 8 and 9), a nanocrystal shell comprises MgS or MgSe and a shell material such as ZnS, ZnSe, or CdSe together. The combination of MgS with a second shell material such as MgSe or ZnS provides a bandgap that extends symmetrically both above and below the bandgap for a ZnSe core more effectively than either one alone would, as illustrated in FIG. 5 for MgS plus ZnS. The increased photostability of the nanocrystals having magnesium included in the shell, which is seen in FIGS. 10-12, may be the result of this match of the bandgap of the shell with the core. Presumably the bandgap for the mixture of MgS plus ZnS that is illustrated in FIG. 5 will have a higher-end bandgap value that is higher than that of ZnS because it is increased by the presence of MgS; the lower endpoint is similar for both materials, so the mixture has little effect at that end of the bandgap. The bandgap analysis suggests that MgS alone would give a suitable shell, and it has been shown experimentally that the combination of MgS with ZnS works very well.

The MgS and ZnS (or CdSe or ZnSe) may be present as two individual shell layers in either order, or as a single layer containing Mg and Zn (or Cd) mixed together. If present in two layers, the layers may be placed on the core in either order, i.e., the MgS layer may be the inner of the two layers, or the ZnS layer may be the inner of the two layers. If mixed together in one layer (see FIG. 9), the MgS and second shell material such as ZnS may be mixed in any ratio that provides a bandgap with improved properties over ZnS alone. If present in one layer, the layer may be relatively homogeneous or it may occur as a gradient where the inner part of the layer is mainly ZnS or another suitable shell material, and the ratio of MgS increases upon moving outward from the core. Alternatively, if present in one layer, the layer may have a higher Mg to Zn (or Cd) ratio nearest the core and the ratio may decrease upon moving outward from the core.

Also disclosed herein are methods and compositions that provide nanocrystals having greater luminescent intensity, or brightness, than conventional nanocrystals that have CdSe cores. Brightness of a nanocrystal determines how easily detected it will be in a system that uses nanocrystals as labels or markers, thus increasing brightness enhances the usefulness of a nanocrystal. The brightness that can be achieved by a nanocrystal is largely determined by its core, since the core determines both the absorption characteristics and the emission characteristics (quantum yield) that the nanocrystal can achieve. A core comprising significant amounts of Zn is advantageous relative to conventional CdSe cores, because it increases brightness because its absorption of light in the visible spectrum tends to be better than that of CdSe and it also provides high quantum yield. Accordingly, in some embodiments, the invention provides nanoparticles having a core that comprises Zn, as further described herein. In addition, a core that comprises Zn typically has a wider bandgap than a CdSe core, so it has The brightness of a nanocrystal, however, can be lost rapidly if the core is not protected from the environment by a shell or other coating. A coating or shell is needed to prevent the core from reacting with its environment, particularly when it is in its photoactivated state. The photoactivated state has a 'separated' electron and hole, which can react with species such as oxygen in ways that would not occur when the core material was in its ground state. Such reactions degrade the luminescent properties of the core, but can be prevented by a suitable coating or shell. In some embodiments, the invention thus provides a core having a shell, where the shell slows photodegradation of the core. In some embodiments, the shell is a magnesium-containing shell that slows degradation relative to a similar shell lacking magnesium. In addition, the methods and compositions of the invention provide brighter nanocrystals that emit in the green, blue and yellow parts of the visible light spectrum, which complements the conventional CdSe core nanocrystals, which tend to emit in the red and orange region of the spectrum. Conventional nanocrystals do not provide blue or green colors having very high levels of luminescent intensity: nanocrystals having greater brightness in these emission regions are needed. Nanocrystals of the invention having blue, green or blue-green emission bands and brightness that is significantly enhanced relative to conventional CdSe core nanocrystals are therefore an aspect of the invention.

For clarity of disclosure, and not by way of limitation, the detailed description of the invention is divided into the subsections that follow.

Definitions

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

As used herein, 'about' means that the numerical value is approximate and small variations would not significantly affect the practice of the invention. Where a numerical limitation is used, unless indicated otherwise by the context, 'about' means the numerical value can vary by ±10% and remain within the scope of the invention.

"Alkyl" as used in reference to alkyl phosphine, alkyl phosphine oxide, or alkylamine refers to a hydrocarbon group having 1 to 20 carbon atoms, frequently between 4 and 15 carbon atoms, or between 6 and 12 carbon atoms, and which can be composed of straight chains, cyclics, branched chains, or mixtures of these. The alkyl phosphine, alkyl phosphine oxide, or alkylamine include embodiments having from one to three alkyl groups on each phosphorus or nitrogen atom. In preferred embodiments, the alkyl phosphine or alkyl phosphine oxide has three alkyl groups on P, and the alkyl amine(s) have one alkyl group on N. In some embodiments, the alkyl group contains an oxygen atom in place of one carbon of a C4-C15 or a C6-C12 alkyl group, provided the oxygen atom is not attached to P or N of the alkyl phosphine, alkyl phosphine oxide, or alkylamine. In some embodiments, the alkyl can be substituted by 1-3 substituents selected from halo and C1-C4 alkoxy. Preferred alkyl phosphines include compounds of the formula $[(C_4-C_{10})_3]P$. Preferred alkyl phosphine oxides include compounds of the formula $[(C_4-C_{10})_3]P=O$. Preferred alkylamines include compounds of formula $(C_4-C_{10})_2NH$ and $(C_4-C_{10})_2NH_2$, where each $C_4-C_{10}$ alkyl is a straight or branched chain unsubstituted alkyl group. Preferred alkyl phosphonic acids and alkyl phosphinic acids include those having 1-15 carbon atoms and preferably 2-10 carbon atoms or 3-8 carbon atoms.

"Hydrophobic" as used herein refers to a surface property of a solid, or a bulk property of a liquid, where the solid or liquid exhibits greater miscibility or solubility in a low-dielectric medium than it does in a higher dielectric medium. A nanocrystal that is soluble in organic solvents that are not miscible with water, such as ethyl acetate, dichloromethane, MTBE, hexane, or ether, is hydrophobic. By way of example only, nanocrystals that are soluble in a hydrocarbon solvent such as decane and are insoluble in an alcohol such as methanol are hydrophobic.

"Hydrophilic" as used herein refers to a surface property of a solid, or a bulk property of a liquid, where the solid or liquid exhibits greater miscibility or solubility in a high-dielectric medium than it does in a lower dielectric medium. By way of example, a material that is more soluble in methanol than in a hydrocarbon solvent such as decane would be considered hydrophilic.

"Growth medium" as used herein refers to a mixture of reagents and/or solvents in which a nanocrystals is grown or in which a shell is grown on a nanocrystals. These growth media are well known in the art, and often include at least one metal, at least one chalcogenide (a compound of S, Se, or Te), and one or more alkyl phosphines, alkyl phosphine oxides, alkyl phosphonic acids, alkyl phosphinic acids or alkylamines.

"Luminescence" refers to the property of emitting electromagnetic radiation from an object. Typically, the electromagnetic radiation is in the range of UV to IR radiation and may refer to visible electromagnetic radiation, for example light. Luminescence may result when a system undergoes a transition from an excited state to a lower energy state resulting in the release of a photon. The transition responsible for luminescence can be stimulated through the release of energy stored in the system chemically or kinetically, or can be added to the system from an external source, such as, for example by a photon or a chemical, thermal, electrical, magnetic, electromagnetic, physical energy source, or any other type of energy source capable of exciting the system. In some embodiments, 'luminescence' refers to fluorescence—emission of a photon that is initiated by excitation with a photon of higher energy (shorter wavelength) than the emitted photon.

"Exciting a system" or "exciting" or "excitation" refers to inducing the energy state of a system into a higher state than that of ground state. The term "excitation wavelength" refers to electromagnetic energy which may have a shorter wavelength than that of the emission wavelength that is used to excite the system. The "energy states" of the system described herein can be electronic, vibrational, rotational, or any combination thereof. The term "emission peak" refers to the wavelength that has the highest relative intensity within a characteristic emission spectra.

The term "solid solution", as used herein, may refer to a compositional variation that is the result of the replacement of an ion or ionic group for another ion or ionic group, for example, CdS in which some of the Cd atoms have been replaced with Zn. In contrast, a "mixture" or "alloy", as used herein, may refer to a class of matter composed of two or more substances in which each substance retains its own identifying properties.

The term "monodisperse" refers to a population of particles having substantially identical size and shape. For the purpose of the present invention, a "monodisperse" population of particles means that at least about 60% of the particles or, in some cases, about 75% to about 90% or more of the particles, fall within a specific particle size range, and the particles deviate in diameter or largest dimension by less than 10% rms (root-mean-square) and, in some cases, less than 5% rms. One of ordinary skill in the art will realize that particular sizes of nanocrystals, such as of semiconductor nanocrystals, are actually obtained as particle size distributions.

While compositions and methods are described in terms of "comprising" various components or steps (interpreted as meaning "including, but not limited to"), the compositions and methods can also "consist essentially of" or "consist of" the various components and steps, such terminology should be interpreted as defining essentially closed-member groups.

Nanocrystals

Any suitable nanocrystal can be used with the methods and the magnesium-containing shell coatings disclosed herein. The methods and shells of the invention provide increased photostability for nanocrystals. For example, the methods of the invention can be used to modify the shell of a core-shell nanocrystal to increase its photostability. In some embodiments, the methods increase the photostability relative to that of the same nanocrystal that has not been treated with magnesium so that the nanocrystal loses less than about 10% of its emission intensity under photodegradation conditions that reduce the emission intensity of the untreated nanocrystal by 20% or by 40%. In some embodiments, the nanocrystals of the invention provide fluorescence intensity that is at least about 100% greater than that of a corresponding CdSe-core nanocrystal having the same emission maximum wavelength.

Figure 1:
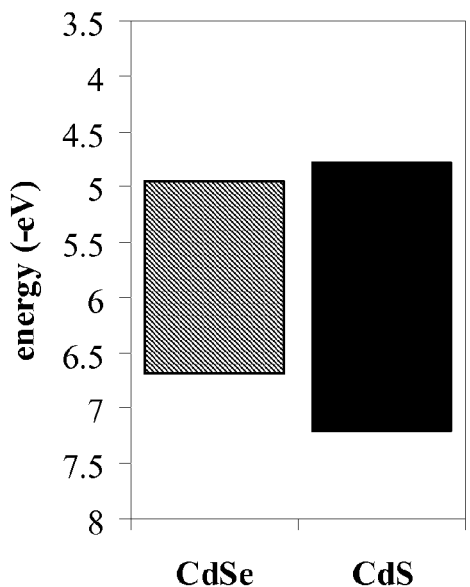
FIG. 1 shows the band gap energy diagram for CdSe versus CdS semiconductive material. CdS has a wider bandgap than CdSe, and can thus be used as a shell for a CdSe core, but the CdS bandgap does not extend much above the high end of the CdSe bandgap.
Figure 2:
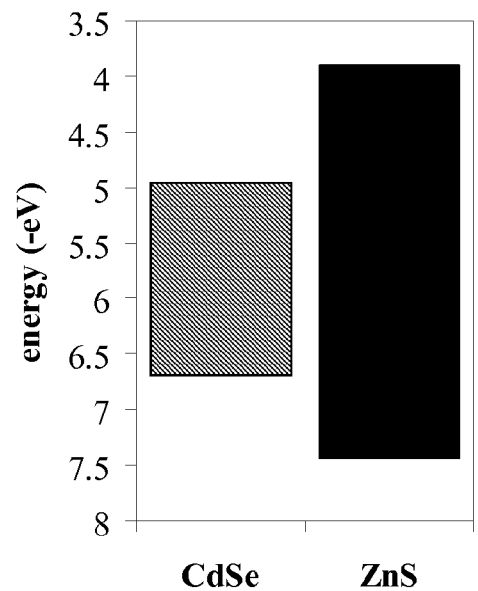
FIG. 2 shows the band gap energy diagram for CdSe versus ZnS semiconductive material. ZnS has a much wider bandgap than CdSe, as illustrated here, and CdSe nanocrystals can be effectively protected from degradation (photostabilized) by a shell of ZnS. This combination is commonly used in commercial quantum dots.
Figure 3:
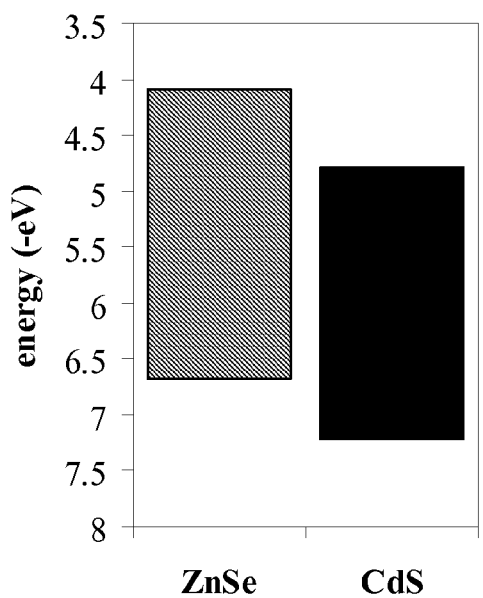
FIG. 3 shows the band gap energy diagram of ZnSe versus CdS semiconductive material.
Figure 4:
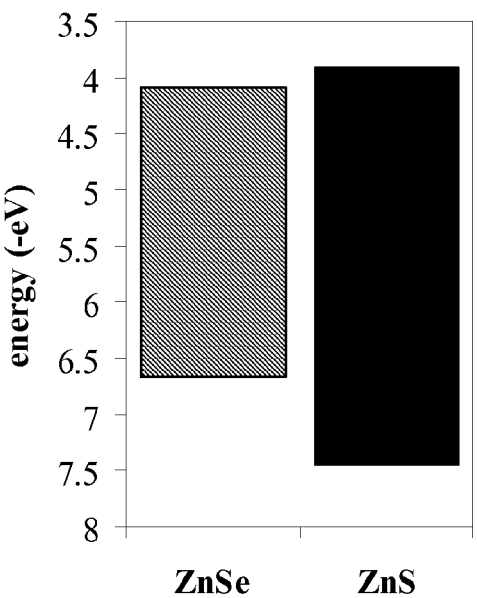
FIG. 4 shows the band gap energy diagram of ZnSe versus ZnS semiconductive material.

The methods of the invention are suitable for increasing the bandgap of a shell comprising ZnS, for example, on any nanocrystal core: adding Mg to the ZnS of a shell increases the bandgap of the shell, thus increasing its ability to shield the core. This increases photostability of the nanocrystal. The magnesium-containing shells of the invention are suitable for use on any nanocrystal core having a bandgap with both endpoints in the range between about −4 eV and −7 eV. A suitable example is a ZnSe or ZnCdSe nanocrystal core. The bandgap for CdSe suggests that it should also work—see FIG. 2. ZnSe is another exemplary suitable shell material.

Generally, a nanocrystal is a semiconductive particle, having a diameter or largest dimension in the range of about 1 nm to about 1000 nm, or in the range of about 2 nm to about 50 nm, and in certain embodiments, in the range of about 2 nm to about 20 nm. The term "semiconductor nanocrystal" or "quantum dot" are used interchangeably herein to refer to nanocrystals composed of a crystalline inorganic semiconductor material or mixture of materials. These nanocrystals, or quantum dots, are luminescent and are useful as fluorescent markers or labels that facilitate identifying, locating, tracking, or quantifying, etc. molecules, particles, cells and the like. A nanocrystal or quantum dot may include one or more shells or other coatings in addition to a semiconductor core.

The nanocrystal is comprised of a core and a shell. The terms "semiconductive core", "nanocrystal core", "core nanocrystal" or "core" refer to a nanocrystal composed of an inorganic semiconductive material, a mixture or solid solution of inorganic semiconductive materials, or an organic semiconductive material. Cores can be isolated, or can be partially or fully covered by a shell or shells.

The term "shell" refers to an inorganic semiconductive layer surrounding a nanocrystal core. An "inorganic shell", as described herein, is a shell composed of an inorganic material, or a mixture or solid solution of inorganic materials. A suitable shell provides insulating ability both above and below the bandgap of the core material. A suitable shell for a particular nanocrystal core will have a bandgap that is wider than the bandgap of the core, and that extends above the high end of the bandgap of the core and below the low end of the bandgap of the core. In certain embodiments, the inorganic shell may be composed of an insulating material or another semiconductive material. In some embodiments, the shell comprises magnesium and is referred to herein as a magnesium-containing shell. Some embodiments of the nanoparticles of the invention have a shell that comprises MgS. In some embodiments, the shell comprises or consists essentially of a mixture of ZnS and MgS. In some embodiments, the mixture is chosen to provide a bandgap that is more effective to provide photostabilization than a corresponding magnesium-free semiconductive material.

"Core/shell nanocrystal" or "core/shell quantum dot" as used herein refers to a nanocrystal that includes a nanocrystal core of one or more first semiconductor materials contained within or substantially coated with a shell of a second inorganic material that is frequently a semiconductor, also.

Provided herein are semiconductor nanocrystals comprising a core and a magnesium-containing layer. The semiconductor nanocrystals can comprise more than one magnesium-containing layer, such as 2, 3, 4, 5, 6, or more layers. The core can be a semiconductor core. The semiconductor core can generally comprise any suitable semiconductor material, or mixtures of two or more suitable semiconductor materials. The core of a semiconductor nanocrystal can be a semiconductor material including, but not limited to, those of Groups II-VI of the periodic table of elements, for example ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, and the like, and those of Groups III-V of the periodic table of elements, such as GaN, GaP, GaAs, GaSb, and the like, and those of Group IV of the periodic table of elements (Ge, Si, and the like), as well as alloys or combinations or mixtures thereof. An example of a suitable semiconductor core material is ZnX, where X is Se, S, or Te. Particular core materials that are well suited for the present invention as indicated by analyses of their bulk bandgaps and lattice spacing (mismatch of less than about 4%) include ZnS, AlP, GaP, ZnSe, AlAs, GaAs, CdS, HgS, ZnSe and ZnCdSe and mixtures of any two of these. In certain embodiments, the core comprises, consists essentially of, or consists of ZnSe and/or ZnCdSe or a mixture of these two.

Some particular embodiments of the core comprise Zn. Zn is advantageous because it provides nanocrystals that are larger than corresponding Cd-based nanocrystals that emit at a particular fluorescence wavelength. Where Zn is used as a component of the core, it may be mixed with a second metal such as Cd, Ga, Hg, or Al. Cd can be added, for example, to shift the color of the fluorescence toward green. The ratio of Zn to other metals if present is typically at least 0.25 or at least 0.5 or at least about 1. In some embodiments the ratio is at least about 2.

In some embodiments, the core comprises or consists essentially of ZnSe. In some embodiments, the core comprises or consists essentially of a mixture of ZnSe and CdSe in a ratio that provides a luminescent intensity that is at least about 50% higher than and optionally at least about 100% higher than the luminescent intensity of a CdSe nanocrystal core having the same fluorescence emission maximum wavelength. Preferably, the ratio of Zn to Cd in a nanocrystal core for the present invention is at least 0.5 and frequently it is 1, or higher than 1, or higher than about 2. In some embodiments, sufficient Cd is added to shift the emission wavelength to a wavelength above 500 nm.

Figure 13:
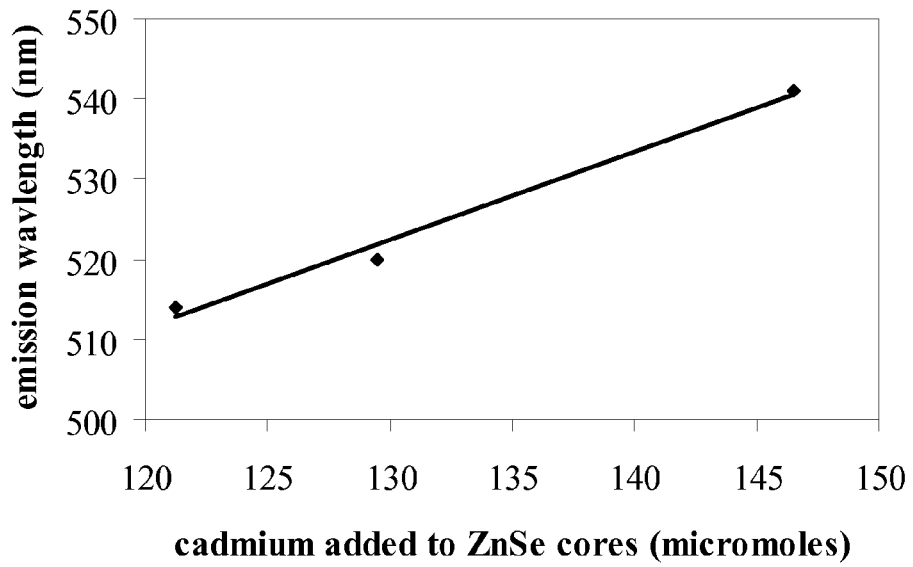
FIG. 13 shows the effect on emission wavelength of doping different amounts of cadmium into ZnSe cores. Increasing the amount of Cd used in three successive preparations demonstrated that using more Cd used making the Cd-modified cores (presumably producing cores having an increased amount of Cd) caused the wavelength maximum for emission to increase.

FIG. 13 demonstrates how increasing the amount of Cd material used in preparation of a ZnCdSe core increases the wavelength of the nanocrystal fluorescence to a wavelength between 510 and 520 nm, or between 515 and 520 nm, or between 530 and 550 nm. Thus in some embodiments, the invention provides a nanocrystal having a luminescent intensity that is at least about 50% higher than and optionally at least about 100% higher than the luminescent intensity of a CdSe nanocrystal core having the same fluorescence emission maximum wavelength, where the fluorescence wavelength is above 500 nm, or above 510 nm, or above 520 nm, or above 530 nm, or above 540 nm, or between any two of these values, or to a wavelength between about 510 and 550 nm.

The magnesium-containing layer can be a monolayer, or can be a thicker layer comprised of several monolayers. The magnesium-containing layer can generally comprise any magnesium material. An example of a magnesium material is MgX, where X is B, Al, Ga, In, C, Si, Ge, Sn, Pb, N, P, As, Sb, Bi, O, S, Se, or Te or mixtures. The semiconductor nanocrystals can further comprise a shell made of a second semiconductor material different from the core semiconductor material. The Mg-containing layer can be anywhere relative to the shell, but is preferable outside of the shell. The magnesium-containing layer may, in some embodiments, further comprise at least one additional semiconductive material. For example, the layer may be a homogeneous mixture of the magnesium material and the at least one semiconductive material, a gradient of the magnesium material and the at least one semiconductive material, or layers of the magnesium material and the at least one semiconductive material. Gradients may have higher concentrations of MgX closest to the core, or may have lower concentrations of MgX closest to the core.

In some embodiments, the semiconductor nanocrystal has a substantially uniform magnesium-containing layer. The uniformity can be determined by Z-contrast scanning transmission electron microscopy (Z-STEM), see McBride, et al., Nano Letters (2006) 6:1496-1501. In another embodiment, the magnesium-containing layer comprises at least 1, 2, 3, 4, 5, 6, or more monolayers surrounding the entire core/shell of the nanocrystal.

Semiconductive material that may be used in the shell or shells of core/shell nanocrystals may include, but are not limited to, materials made up of a first element from Groups 2, 12, 13 or 14 of the Periodic Table of the Elements and a second element from Group 16, for example, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, and BaTe; materials made up of a first element from Group 13 of the Periodic Table of the Elements and a second element from Group 15, for example, GaN, GaP, GaAs, GaSb, InN, InP, InAs, InSb, and BP; materials made up of a Group 14 element, for example, Ge and Si; materials such as PbS and PbSe; and alloys, solid solutions, and mixtures thereof. In some embodiments, the shell comprises Mg, or it comprises a mixture of Mg and Zn. In certain embodiments, the shell comprises MgS. Optionally, it can include MgS mixed with ZnS. The ratio of MgS to ZnS can vary from about 0.05 to about 0.95, frequently it is between 0.1 and 0.8 and preferably it is between about 0.1 and about 0.5.

In some embodiments, the nanocrystals of the invention include two shell layers. In certain embodiments, the first shell layer is selected from CdSe, CdS, ZnS, and ZnSe and the second shell layer is selected from MgS and MgSe. The two shell layers may be disposed on the core in either order. Thus embodiments of the invention include nanoparticles having a core of ZnSe or ZnCdSe with two shells; one of the shells comprises CdSe, CdS, ZnS or ZnSe and the other shell comprises MgS or MgSe. The two shells may be separate layers, but typically at least some blending of the materials will occur at the interface between the two layers. Where the magnesium-containing layer contains S and a second shell material is present, the second shell material may also comprise S, e.g., it can be ZnS or CdS. Where the magnesium layer comprises Se and a second shell layer is present, the second shell material frequently comprises Se, e.g., it can be ZnSe or CdSe.

In other embodiments, the shell or shells may contain an additive which may be incorporated into the shell with one or more of the shell precursors and may or may not be a semiconductive material. In some embodiments, the additive may be an element of Groups 2, 12, 13, 14, 15 and 16, as well as Fe, Nb, Cr, Mn, Co, Cu, and Ni, and in others, the additive may simply be a super-abundance of one of the core or shell precursors. The additive may be incorporated into one or more layer of the shell, the core, or both the core and one or more layers of the shell, or may be present only in an interfacial region between the core and the shell or between two layers of a multilayer shell. The interfacial region wherein the semiconductive core and shell meet may contain elements of both the shell and core and of the additive. While not wishing to be bound by theory, incorporating an additive into at least the interfacial region of the nanocrystal may reduce stresses in the core-shell interface caused by the differences in the lattice structures of the core and shell. Reduction of these stresses may serve to improve the strength and uniformity of the core-shell composite. When present in the shell, the additive may be uniformly distributed throughout the shell or may be distributed as a gradient. For example, the additive may be present as a gradient that exhibits a decreasing concentration in an outward direction from the semiconductive core. In certain embodiments, the additive may not be incorporated into the nanocrystal at all, but may merely facilitate overgrowth of a high-quality thick shell on a core.

In still other embodiments, the shell may additionally contain one or more materials that are not a semiconductive material, such as for example, oxygen or other material present during preparation of the shell. These materials may be deliberately added to the reaction mixture, or they may occur adventitiously; commonly they do not materially affect the semiconductive properties of the shell material.

The shell may be made up of about 1 to about 20 monolayers and may, typically, be made up of about 4 to about 15 monolayers. Examples of the number of monolayers include 1, 2, 3, 4, 5, 6, 7, 8, 9, 10, 11, 12, 13, 14, 15, 16, 17, 18, 19, 20, and ranges between any two of these values. The diameter of a core/shell nanocrystal prepared using methods of embodiments of the invention may be from about 1 nm to about 1000 nm, in some embodiments, about 2 nm to about 50 nm, and in certain embodiments, about 2 nm to about 20 nm. Specific examples of diameters include about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, and ranges between any two of these values.

The nanocrystals may generally emit at any wavelength, or at any color if the emission is in the visible spectrum. In some embodiments, the nanocrystals are blue or green, emitting at wavelengths of from about 400 nm to about 600 nm, and in certain embodiments, the nanocrystals may emit at below about 500 nm. Without wishing to be bound by theory, nanocrystals having a ZnX core may be better suited for making nanocrystals that are blue or green emitting than the CdSe/ZnS nanocrystals currently used. Nanocrystals having a ZnX core that emit light in the blue or green will be larger than nanocrystals having a CdSe core. Since larger cores have larger extinction coefficients, this means that ZnX cores that provide a particular emission wavelength will be brighter and therefore more useful in applications where high sensitivity is required. "Brightness" as used herein refers to the fluorescence intensity provided by a nanocrystal. A "bright nanocrystal" is a nanocrystal that is not a conventional CdSe core/ZnSe shell nanocrystal, and which provides a greater fluorescence intensity than a conventional CdSe core/ZnSe shell nanocrystal having the same fluorescence emission wavelength and approximately the same shell layer thickness as the 'bright nanocrystal.' Qdot 525 is an example of a conventional nanocrystal, having a fluorescence emission wavelength of 525 nm, and is used for some comparisons herein. For the purpose of comparing properties like this, two nanocrystals are viewed as having the 'same' emission wavelength if their emission maxima differ by less than about 5 nm.

Figure 6:
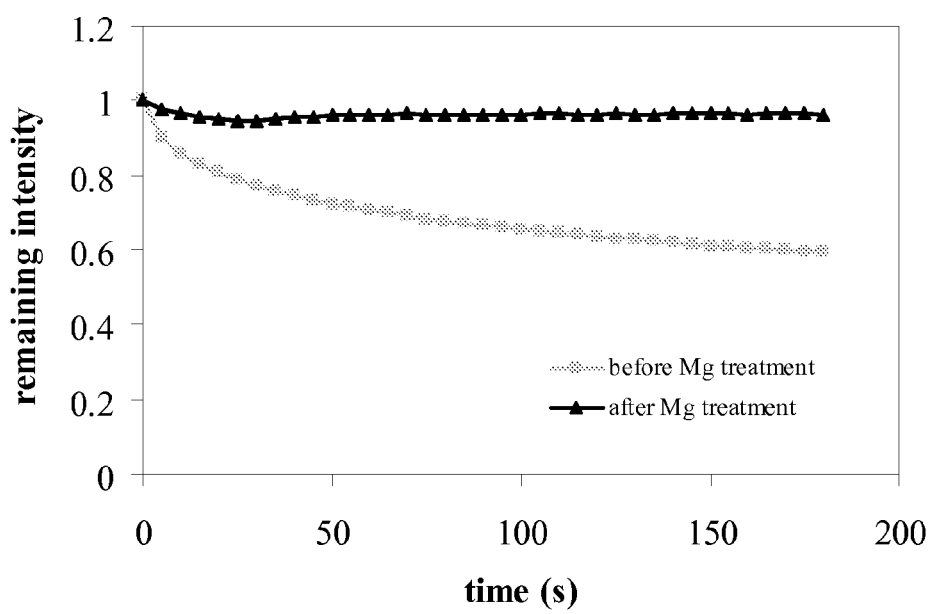
FIG. 6 shows the emission intensity of hydrophobic ZnCdSe/ZnS core/shells and Mg treated hydrophobic ZnCdSe/ZnS core/shells in hexane. It illustrates that a Mg treatment method of the invention enhances the photostability of a ZnCdSe core, and shows that the ZnCdSe core is not well protected by a ZnS shell alone due to photoinstability.
Figure 7:
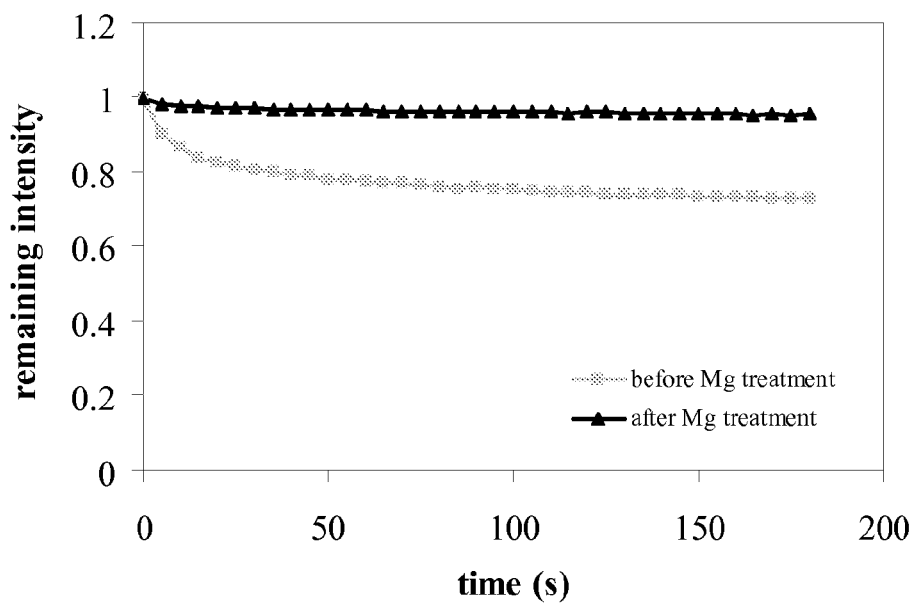
FIG. 7 shows the emission intensity of water dispersible ZnCdSe/ZnS core/shells and Mg treated water dispersible ZnCdSe/ZnS core/shells in aqueous solvent. This is similar to FIG. 6, with a ZnCdSe core that provides a different emission maximum.

The band gap energy of MgS may span the band gap energy of ZnSe or ZnCdSe more symmetrically than ZnS. Without wishing to be bound by theory, at least one monolayer of MgS coating a ZnSe or ZnCdSe core may provide coating which sufficiently insulates the core from the outside environment, protecting the core electrons and holes from the deleterious effects of such elements as oxygen and providing improved chemical and photo stability. In addition, a mixture of MgS and ZnS may provide broader protection than MgS alone, as the mixture may provide a bandgap that better covers and extends beyond that of ZnSe or ZnCdSe on both the high and low ends of the core's bandgap. As illustrated in FIGS. 6 and 7, the emissions intensity of ZnCdSe/ZnS core/shell nanocrystals that have been treated with a magnesium reagent to introduce MgS show improved stability over untreated ZnCdSe/ZnS nanocrystals.

Thus provided here are methods to improve the photostability of a nanocrystal. Photostability can be assessed by methods described herein, by measuring the integrated emission intensity of the nanoparticle over time under constant illumination. The illumination source was a 375 nm emitting Shark Series Visible LED purchased from Opto Technology, Inc. running at a constant current of 48 mA. A material is considered to be photostable if it loses little of its fluorescent intensity during irradiation for a 3 minute period under these conditions. In some embodiments, the nanocrystal is considered to be photostable if it retains 95% or more of its initial fluorescent intensity after this treatment. In other embodiments, a nanocrystal is considered photostable if it retains at least 90% of its initial fluorescent intensity. In other embodiments, a nanocrystal is considered photostable if it retains at least 80% of its initial fluorescent intensity. In other embodiments, a nanocrystal is considered photostable if it retains at least 90% of its initial fluorescent intensity under conditions where a reference, such as a nanocrystal that has not been treated with magnesium when used as a reference for a nanocrystal that has been treated with magnesium, loses at least 20% of its initial emission intensity, or at least 40% of its initial fluorescent intensity. FIGS. 6 and 7 depict tests of photostability done using this method. For this purpose, if hydrophobic nanoparticles were tested, then hexane was used to dilute the sample, and if hydrophilic nanoparticles were tested, then 50 mM borate buffer was used to dilute the sample. These measurements are typically done to compare the rate of loss of emission intensity of a nanocrystal to a standard; where a suitable standard is not otherwise disclosed, the core alone of a core/shell nanocrystal can be used as a standard, and test conditions can be adjusted so that the core loses at least about 40% of its fluorescent intensity during the time course of the test. The test material and standard should be tested at equivalent optical densities. In samples where the core alone is used as a reference standard, illumination can be maintained for a time period that causes the reference standard to lose 40% of its initial intensity, and the core/shell nanocrystal is considered to be photostable relative to its core when it loses less than about 10% of its fluorescent intensity during the time required for the core alone to lose 40% of its fluorescent intensity.

The methods of the invention are especially applicable to nanocrystals having a shell that comprises ZnS, and include treating the core/shell nanocrystal with a magnesium reagent under conditions that cause the magnesium to exchange into the shell to an extent that modifies the bandgap of the semiconductor material of the shell. In some embodiments, the method provides a nanocrystal having increased photostability. Photostability can be increased sufficiently for the treated nanocrystal to lose less than 10% of its fluorescence intensity under conditions that reduce the intensity of the untreated nanocrystal by 20%. In some embodiments, photostability is increased sufficiently for the treated nanocrystal to lose less than 10% of its fluorescence intensity under conditions that reduce the intensity of the untreated nanocrystal by 40%.

One specific embodiment of the invention is a semiconductor nanocrystal comprising a $Zn_xCd_{1-x}Se$ core, a ZnS first shell, and a MgS second shell. The value "x" can be any number or fraction from 0 to 1. Thus the semiconductor core comprises Zn and Cd in a ratio. In some embodiments, the ratio of Zn to Cd is at least 0.5. In other embodiments the ratio of Zn to Cd is at least 1 or at least about 2. In these embodiments, the ZnS and MgS shells may be discrete, or they may intermix to any degree. The core contacts the first shell. The first shell contacts the core and the second shell. The second shell contacts the first shell. This is graphically shown in FIG. 8. Optionally, the order of the two layers can be reversed, so the MgS layer is in contact with the core.

In some embodiments, provided herein is a method to increase fluorescence intensity by at least 100% over the fluorescence of a conventional nanocrystal having a CdSe core and the same fluorescence emission maximum wavelength. In some embodiments, the method can increase fluorescence intensity by at least 100% over the fluorescence of a conventional nanocrystal having a CdSe core and the same fluorescence emission maximum wavelength. In these embodiments, the invention also provides methods to maintain photostability of the nanocrystal. The methods are particularly useful to prepare nanocrystals that have a characteristic emission above about 500 nm, and provides nanocrystals having substantially superior brightness (emission intensity) than conventional CdSe core nanocrystals like Qdot 525, a commercial standard, as demonstrated by FIGS. 10-12. Nanocrystals of the invention thus include nanocrystals having photostability and also having characteristic emission maxima above 500 nm, optionally between 500 and 550 nm, while providing fluorescence intensity that is at least twice that of a corresponding CdSe core nanocrystal.

An additional specific embodiment of the invention is a semiconductor nanocrystal comprising a $Zn_xCd_{1-x}Se$ core, and a $Mg_yZn_{1-y}S$ first shell. The value "x" and "y" can be any number or fraction from 0 to 1. In some embodiments y is selected by determining what amount of Mg is needed to provide at least a monolayer of MgS over the nanocrystal on which the shell is used, which the person of ordinary skill can readily calculate from the size or surface area of the nanocrystal. The core contacts the first shell. This is graphically shown in FIG. 9. The composition of the core can vary across the range described above for a nanocrystal core comprising a mixture of Zn and Cd together. The composition of the shell can vary across the range disclosed above for a shell that comprises a mixture of Mg and Zn together. The result is a nanocrystal having increased fluorescent intensity relative to a nanocrystal with the same maximal fluorescence emission wavelength having a CdSe core, and photostability comparable to that of conventional nanocrystals having a CdSe core. While applicable to nanocrystals with fluorescence colors across the visible spectrum, the greatest benefits of the invention may be achieved by the corresponding nanocrystals that have fluorescence maxima in the blue, green and yellow portions of the spectrum.

Methods of Preparation

Provided herein are methods for making nanocrystals disclosed herewith and methods for modifying known core/shell nanocrystals using the principles disclosed herein to increase the photostability of the nanocrystals. Alternative embodiments include various methods for the preparation of semiconductor nanocrystals comprising a core and a magnesium-containing layer, as well as nanocrystals made by the disclosed methods.

A method for the preparation of semiconductor nanocrystals using sequential coating comprising a core and a magnesium-containing layer can comprise: providing a semiconductor core; coating the core with an inorganic shell to provide a core-shell intermediate; and contacting the intermediate with a magnesium material to produce a semiconductor nanocrystal comprising a core and a magnesium-containing layer. The core can generally be any semiconductor core, for example, ZnX, where X is Se, S, or Te.

The step of contacting the core/shell nanocrystal with the magnesium material can be conducted under conditions similar to those described herein. For example, the core/shell nanocrystal can be dispersed in a suitable liquid medium and contacted with the magnesium material of choice to form a mixture. The mixture can then be heated for any suitable time period, usually between about 0.5 hr and 4 hr, and at any suitable temperature, often between about 120° C. and about 250° C.

The coating step can comprise contacting the core with a first precursor and a second precursor. The first precursor can comprise a first element from Groups 2, 12, 13 or 14 of the Periodic Table of the Elements. The second precursor can comprise a second element from Group 16. Examples of the inorganic shell can include, for example, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, and BaTe. Alternatively, the first precursor can comprise a first element from Group 13 of the Periodic Table of the Elements. The second precursor can comprise a second element from Group 15. Examples of the inorganic shell can include, for example, GaN, GaP, GaAs, GaSb, InN, InP, InAs, InSb, and BP; materials made up of a Group 14 element, for example, Ge and Si; materials such as PbS and PbSe; and alloys, solid solutions, and mixtures thereof.

The magnesium material can generally be any magnesium-containing material. Examples of magnesium materials include $Me_2Mg$, dibutylmagnesium, MgO, $MgF_2$, $MgCl_2$, $MgBr_2$, $MgI_2$ $Mg(acetoacetonate)_2$, $Mg(C_2H_3O_2)_2$, $MgTiO_3$, $MgWO_4$, $MgZrO_3$, $Mg_2Si$, $Mg(MnO_4)_2$, $Mg(ClO_4)_2$, $MgCO_3$, $MgB_2$, bis(cyclopentadienyl)Mg, $MgS_2O_3$, $MgSO_4$, $MgHPO_4$, $Mg(HSO_3)_2$, $MgAl_2O_4$, and $Mg(NO_3)_2$. In some embodiments, the magnesium material for use in the methods for introducing magnesium into a shell is selected from magnesium bromide, magnesium acetate or another magnesium alkylcarboxylate, and magnesium chloride; preferably the magnesium material is magnesium acetate.

The magnesium-containing layer may be made up of about 1 to about 20 monolayers and may, typically, be made up of about 4 to about 15 monolayers. Examples of the number of monolayers include 1, 2, 3, 4, 5, 6, 7, 8, 9, 10, 11, 12, 13, 14, 15, 16, 17, 18, 19, 20, and ranges between any two of these values. The magnesium-containing layer can be from less than 1 nm to more than 5 nm in thickness, for example it can be from about 1 to about 5 nm in thickness or from about 2 to about 4 nm in thickness.

The contacting step with the magnesium material can generally be performed under any suitable conditions and can be performed in the presence of at least one solvent. Suitable solvents include fatty acids such as stearic acid or lauric acids; amines such as alkylamines or dodecylamine; phosphines such as trioctylphosphine; phosphine oxides such as trioctylphosphine oxide; phosphonic acids such as tetradecylphosphonic acid; phosphoramides; phosphates; phosphates; and mixtures thereof. Other solvents including, for example, alkanes, alkenes, halo-alkanes, ethers, alcohols, ketones, esters, and the like, may also be useful in this regard, particularly in the presence of added nanocrystal ligands. It is to be understood that the first and second solvents may be the same solvent and, in "one-pot" type synthesis, may be the same solution.

The contacting step can generally be performed at any suitable temperature. For example, the temperature can be greater than about 120° C. or greater than about 150° C. or greater than about 200° C. The temperature can be held steady during the contacting step, or can be varied during the contacting step.

This method offers certain advantages over methods that directly coat a nanocrystal core with a magnesium-containing layer. For example, this method permits the user to produce a core/shell nanocrystal by known methods, which ensures that no lattice matching problems arise in the coating step. While the known core/shell nanocrystals of this type have less desirable photostability characteristics, the methods of the invention provide a method to improve photostability and thus enhance the usefulness of the nanocrystals significantly. These methods are particularly well suited for use with a Zn-containing core, preferably a core that contains at least about 5% Zn. The methods can be used with cores such as ZnSe and ZnCdSe, as further described herein. Specific shells that are suitable as the shell of the core/shell nanocrystals in these methods include those known to provide a stable shell on these nanocrystal cores, such as ZnS and ZnCdS.

An alternative method for the preparation of semiconductor nanocrystals comprising a core and a magnesium-containing layer coats the semiconductor core and can comprise: providing a semiconductor core; and contacting the semiconductor core with a magnesium material to produce a semiconductor nanocrystal comprising a core and a magnesium-containing layer. The core can generally be any semiconductor core, for example, ZnX, where X is Se, S, or Te.

The magnesium material can generally be any magnesium-containing material. Examples of magnesium materials include $Me_2Mg$, dibutylmagnesium, MgO, $MgF_2$, $MgCl_2$, $MgBr_2$, $MgI_2$ $Mg(acetoacetonate)_2$, $Mg(C_2H_3O_2)_2$ (magnesium acetate), magnesium formate, magnesium propionate, or other carboxylate salts of magnesium such as $(RCO_2)_2Mg$ where R is alkyl, magnesium trifluoroacetate, magnesium benzoate, and the like, $MgTiO_3$, $MgWO_4$, $MgZrO_3$, $Mg_2Si$, $Mg(MnO_4)_2$, $Mg(ClO_4)_2$, $MgCO_3$, $MgB_2$, bis(cyclopentadienyl)Mg, $MgS_2O_3$, $MgSO_4$, $MgHPO_4$, $Mg(HSO_3)_2$, $MgAl_2O_4$, and $Mg(NO_3)_2$. An alkylcarboxylate salt of magnesium or a mixture of alkylcarboxylate salts of magnesium are used in certain embodiments.

The magnesium-containing layer may be made up of about 1 to about 20 monolayers and may, typically, be made up of about 4 to about 15 monolayers. Examples of the number of monolayers include 1, 2, 3, 4, 5, 6, 7, 8, 9, 10, 11, 12, 13, 14, 15, 16, 17, 18, 19, 20, and ranges between any two of these values.

The contacting step with the magnesium material can generally be performed under any suitable conditions and the contacting step can be performed in the presence of at least one solvent. Suitable solvents include fatty acids such as stearic acid or lauric acids; amines such as alkylamines or dodecylamine; phosphines such as trioctylphosphine; phosphine oxides such as trioctylphosphine oxide; phosphonic acids such as tetradecylphosphonic acid; phosphoramides; phosphates; phosphates; and mixtures thereof. Other solvents including, for example, alkanes, alkenes, halo-alkanes, ethers, alcohols, ketones, esters, and the like, may also be useful in this regard, particularly in the presence of added nanocrystal ligands. It is to be understood that the first and second solvents may be the same solvent and, in "one-pot" type synthesis, may be the same solution.

The contacting step can generally be performed at any suitable temperature. For example, the temperature can be greater than about 150° C. or greater than about 200° C. The temperature can be held steady during the contacting step, or can be varied during the contacting step.

Yet another alternative method for the preparation of semiconductor nanocrystals coats the core-shell nanocrystal and comprises a core and a magnesium-containing layer can comprise: providing a semiconductor core-shell nanocrystal; and contacting the semiconductor core-shell nanocrystal with a magnesium material to produce a semiconductor nanocrystal comprising a core and a magnesium-containing layer.

The core-shell nanocrystal can generally have any semiconductor core, for example, ZnX, where X is Se, S, or Te. The core-shell nanocrystal can generally have any semiconductor shell, for example, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InN, InP, InAs, InSb, BP, Ge, Si, PbS, PbSe, mixtures thereof, or alloys thereof.

The magnesium material can generally be any magnesium-containing material. Examples of magnesium materials include $Me_2Mg$, dibutylmagnesium, MgO, $MgF_2$, $MgCl_2$, $MgBr_2$, $MgI_2$ $Mg(acetoacetonate)_2$, $Mg(C_2H_3O_2)_2$, $MgTiO_3$, $MgWO_4$, $MgZrO_3$, $Mg_2Si$, $Mg(MnO_4)_2$, $Mg(ClO_4)_2$, $MgCO_3$, $MgB_2$, bis(cyclopentadienyl)Mg, $MgS_2O_3$, $MgSO_4$, $MgHPO_4$, $Mg(HSO_3)_2$, $MgAl_2O_4$, and $Mg(NO_3)_2$.

The magnesium-containing layer may be made up of about 1 to about 20 monolayers and may, typically, be made up of about 4 to about 15 monolayers. Examples of the number of monolayers include 1, 2, 3, 4, 5, 6, 7, 8, 9, 10, 11, 12, 13, 14, 15, 16, 17, 18, 19, 20, and ranges between any two of these values.

The contacting step with the magnesium material can generally be performed under any suitable conditions and the contacting step can be performed in the presence of at least one solvent. Suitable solvents include fatty acids such as stearic acid or lauric acids; amines such as alkylamines or dodecylamine; phosphines such as trioctylphosphine; phosphine oxides such as trioctylphosphine oxide; phosphonic acids such as tetradecylphosphonic acid; phosphoramides; phosphates; phosphates; and mixtures thereof. Other solvents including, for example, alkanes, alkenes, halo-alkanes, ethers, alcohols, ketones, esters, and the like, may also be useful in this regard, particularly in the presence of added nanocrystal ligands. It is to be understood that the first and second solvents may be the same solvent and, in "one-pot" type synthesis, may be the same solution.

The contacting step can generally be performed at any suitable temperature. For example, the temperature can be greater than about 150° C. or greater than about 200° C. The temperature can be held steady during the contacting step, or can be varied during the contacting step.

Additions to Methods

The above described methods may further comprise one or more steps or details. The following paragraphs describe exemplary additions to the methods.

For example, the method may include heating a solution containing ZnSe core nanocrystals in trioctylphosphine and admixing a Zn containing shell precursor, such as for example, $Et_2Zn$ and a S containing precursor, such as, for example, $(TMSi)_2S$ both in trioctylphosphine to the core mixture. A temperature sufficient to begin deposition of the shell onto the core may be maintained for a period of time. The temperature may then be decreased, and a Mg containing shell precursor, such as, for example, $MgAc_2$ (magnesium acetate) may be added to the mixture. This mixture may then be heated and cooled allowing incorporation of the Mg containing precursor into the shell. In such embodiments, a monolayer of MgS may be deposited as the outermost layer of the shell. Alternatively, the Mg containing precursor may be initially added, or added prior to, or in addition to, the Zn or S containing shell precursor.

Examples of embodiments in which the shell contains an additive include, admixing the core-solvent mixture with an additive-first shell precursor mixture made up of one or more additive(s) and the first shell precursor to form a first reaction mixture. The second shell precursor may be subsequently added to the first reaction mixture to form a second reaction mixture. Heating to a temperature sufficient to induce shell formation may occur prior to, following, or concurrently with the addition of additive-first shell precursor mixture to the core-solvent mixture, or occur prior to, following, or concurrently with the addition of the second shell precursor to the first reaction mixture. In other examples, the core-solvent mixture may be admixed with a first shell precursor to form a reaction mixture, and this reaction mixture may be admixed with an additive-second shell precursor mixture containing one or more additive and the second shell precursor. As in the above embodiments, this mixture may be heated to a temperature sufficient to induce shell formation prior to, following, or concurrently with the addition of additive-second shell precursor mixture to the core, solvent, first shell precursor mixture.

The method of embodiments of the invention may be carried out in a single reaction vessel, a "one-pot" synthesis, or may be carried out using separate syntheses for the semiconductive core and the inorganic shell. Particle size and particle size distribution during the growth stage of the core and shell may be approximated by monitoring the absorption or emission peak positions and line widths of the samples, and dynamic modification of reaction parameters such as temperature and monomer concentration in response to changes in the spectra allows the tuning of these characteristics.

Core nanocrystals may be prepared by many methods. In some embodiments, first and second core precursors may be injected into a reaction solution that may be held at a temperature sufficient to induce homogeneous nucleation of discrete particles. In some embodiments, one or more additive may also be added to the reaction solution used for core preparation. The particles may then be allowed to grow until the desired size has been reached, such as, for example, a diameter of from about 20 Å (2 nm) to about 125 Å (12.5 nm). In some embodiments, the growth process may be stopped by dropping the reaction temperature.

Cores thus prepared may be isolated using methods known to those skilled in the art, such as, for example, flocculation with a non-solvent, for example, methanol. In some embodiments, a monodisperse particle population containing the individual cores may be obtained. The cores may be isolated and/or purified, using methods known to those skilled in the art, from a first solvent and then placed in a second solvent to form a core solution, or in some embodiments, the solution containing a monodisperse nanocrystal population can be used "as is", meaning that further purification or isolation of the cores may not be necessary once core synthesis is completed.

In some embodiments, nanocrystals may be covered with an organic or other overcoating on an outer surface of the nanocrystal. The overcoating may be made up of a material capable of providing compatibility with a suspension medium and a moiety possessing an affinity for the outermost surface of the nanocrystal. For example, suitable overcoating materials may include, but are not limited to, polystyrene, polyacrylate, or other polymers, such as polyimide, polyacrylamide, polyethylene, polyvinyl, poly-diacetylene, polyphenylene-vinylene, polypeptide, polysaccharide, polysulfone, polypyrrole, polyimidazole, polythiophene, and polyether; epoxies; silica glass; silica gel; titania; siloxane; polyphosphate; hydrogel; agarose; cellulose; and the like. These overcoating materials may attach directly to the outermost surface of the nanocrystal or may be associated with a moiety known to intimately associate with the surface of nanocrystals such as, for example, a mercapto, phosphine, or imidazole moiety and the like. The coating may be in the range of about 2 to about 100 nm thick in some embodiments and about 2 to about 10 nm in others.

Methods of Use

The compositions provided herein are particularly beneficial in application where enhanced sensitivity is required. For example, when performing enzyme-linked immunosorbent assays (ELISA), the brightness of the fluorescently labeled antibody is directly related to the overall sensitivity of the assay. For conventional CdSe based core/shell labeled antibodies, red colors are far more sensitive than green, for example. This can make multiplexed assays difficult if the concentrations of antigens are unknown because it is difficult to provide a wide range of readily-distinguished nanocrystal colors while maintaining sufficient sensitivity to detect very low concentrations. FIGS. 10 and 11 show how compositions provided in this invention provide higher emission intensities relative to commercially available CdSe based core/shell nanocrystals.

Additionally, the compositions provided herein are beneficial in fluorescent cell labeling applications where high sensitivity is required. FIG. 12 shows the relative intensities of nanocrystals of one embodiment of the disclosed compositions compared to conventional, commercially available antibody conjugated nanocrystals that emits light at 525 nm. The data show that the composition provided here has significantly higher emission intensities relative to conventional nanocrystals.

The following examples are included to demonstrate some embodiments of the disclosed methods and compositions. It should be appreciated by those of skill in the art that the techniques disclosed in the examples which follow represent techniques discovered by the inventor(s) to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Preparation of Luminescent ZnSe Nanocrystal Cores

To a 50 mL round bottom reaction flask under inert atmosphere, 15 mL of molten hexadecylamine, 98% and 47 µL of Bis(2,4,4,-trimethylpentyl) phosphinic acid (CYANEX 272 from Cytec Industries Inc) were added. The mixture was heated to 100° C. under vacuum while stirring and held for 15 minutes. After the 15 minute hold time, the flask was refilled with nitrogen and further heated to 310° C. At 310° C., a mixture of 0.123 g (1.0 mmol) diethylzinc ($Et_2Zn$) and 1.274 g of 1 M TOP-Se (1.4 mmol Se) (TOP-Se was prepared by dissolving selenium metal in trioctylphosphine) was swiftly injected into the flask. After a 15 minute hold time, an additional syringe of 0.370 g $Et_2Zn$ (3.0 mmol of Zn) and 3.822 g of 1 M TOP-Se (4.2 mmol of Se) was prepared and added at a rate of 18.5 µL/minute for 15 minutes, 50 µL/minute for 30 minutes and 75 µL/minute for 15 minutes. When the precursor addition was completed, the reaction was cooled to room temperature. The final material had an emission maximum wavelength of 424 nm and a full width at half maximum (FWHM) of 15 nm. The peak wavelength of the first absorbance feature was 413 nm. The optical density at 413 nm was 34.4.

Example 2

Preparation of Luminescent ZnSe Nanocrystal Cores

To a 50 mL round bottom reaction flask under inert atmosphere, 15 mL of molten hexadecylamine (HDA), 98% was added. The HDA was heated to 100° C. under vacuum while stirring and held for 15 minutes. After the 15 minute hold time, the flask was refilled with nitrogen and further heated to 310° C. At 310° C., a mixture of 0.123 g (1.0 mmol) diethylzinc ($Et_2Zn$) and 1.274 g of 1 M TOP-Se (1.4 mmol Se) (TOP-Se was prepared by dissolving selenium metal in trioctylphosphine) was swiftly injected into the flask. After a 15 minute hold time, an additional syringe of 0.370 g $Et_2Zn$ (3.0 mmol of Zn) and 3.822 g of 1 M TOP-Se (4.2 mmol of Se) was prepared and added at a rate of 18.5 µL/minute for 15 minutes, 50 µL/minute for 30 minutes and 75 µL/minute for 15 minutes. When the precursor addition was completed, the reaction was cooled to room temperature. The final material had an emission maximum wavelength of 413 nm and a FWHM of 19 nm. The peak wavelength of the first absorbance feature was 408 nm. The optical density at 408 nm was 63.3. The average diameter as measured by TEM for fifty particles was 5.2 nm with a standard deviation of 0.7 nm.

Example 3

Preparation of Luminescent ZnCdSe Nanocrystal Cores

To any given volume of molten ZnSe cores as prepared in Example 1, 6 volumes of toluene followed by 2 volumes of butanol were added. After thoroughly mixing this mixture, 7 volumes of methanol were added. The cloudy mixture was centrifuged at about 3000 rpm for 10 minutes. The supernatant was discarded and 1 volume of hexane was added to dissolve the nanocrystal-containing pellet. The concentration of the hexane solution was determined by measuring the absorbance at the first absorbance feature and dividing by the extinction coefficient. The extinction coefficient was calculated with the following equation, where the particle diameter was measured by TEM.

$$\epsilon = 4.8080 \times (\text{particle diameter in angstroms})^3$$

To a 50 mL round bottom reaction flask under inert atmosphere, 6.3 mL of molten hexadecylamine and 163 nmoles of ZnSe cores in hexane (from above) were added. The flask was held under vacuum until all volatile solvents were removed. Next, 597 μL of a mixture of 1.072 g dimethylcadmium (Me$_2$Cd), 3.57 mL of CYANEX 272, and 25.89 mL trioctylphosphine is added (149 μmol of Cd). Different amounts of cadmium solution have been employed to give other emission wavelengths. Several examples of the effects of cadmium addition on the final emission wavelength of the cores/shells are provided in FIG. 13.

This mixture was heated to 255° C., and held at temperature for 20 minutes. If a core-shell was the final desired product, the shell precursors are immediately added after the 20 minutes hold time (see Example 6). Otherwise, the flask was allowed to cool to room temperature. The final material had an emission maximum wavelength of 498 nm and a FWHM 40 nm.

Example 4

Preparation of Luminescent ZnCdSe Nanocrystal Cores

To any given volume of molten ZnSe cores as prepared in Example 2, 6 volumes of toluene followed by 2 volumes of butanol were added. After thoroughly mixing this mixture, 7 volumes of methanol were added. The cloudy mixture was centrifuged at about 3000 rpm for 10 minutes. The supernatant was discarded and 1 volume of hexane was added to dissolve the nanocrystal-containing pellet. The concentration of the hexane solution was determined by measuring the absorbance at the first absorbance feature and dividing by the extinction coefficient. The extinction coefficient was calculated with the following equation, where the particle diameter was measured by TEM.

$$\varepsilon = 4.8080 \times (\text{particle diameter in angstroms})^3$$

To a 50 mL round bottom reaction flask under inert atmosphere, 6.3 mL of molten hexadecylamine and 150 nmoles of ZnSe cores in hexane (from above) were added. The flask was held under vacuum until all volatile solvents were removed. Next, 301 μL of a mixture of 0.108 g dimethylcadmium (Me$_2$Cd), 0.358 mL of CYANEX 272, and 2.602 mL trioctylphosphine is added (75.3 μmol of Cd).

This mixture was heated to 255° C., and held at temperature for 20 minutes. If a core-shell was the final desired product, the shell precursors are immediately added after the minutes hold time (see Example 7). Otherwise, the flask was allowed to cool to room temperature. The final material had an emission maximum wavelength of 495 nm and a FWHM 40 nm.

Example 5

Coating with Zinc Sulfide Shell

To a volume of molten ZnSe cores as prepared in Example 1, 6 volumes of toluene, followed by 2 volumes of butanol were added. After thoroughly mixing this mixture, 7 volumes of methanol were added. The cloudy mixture was centrifuged at about 3000 rpm. The supernatant was discarded and 1 volume of hexane was added to dissolve the pellet. The concentration of the hexane solution was determined by measuring the absorbance at the first absorbance feature and dividing by the extinction coefficient. The extinction coefficient was calculated with the following equation, where the particle diameter was measured by TEM.

$$\varepsilon = 4.8080 \times (\text{particle diameter in angstroms})^3$$

To a 50 mL round bottom reaction flask under inert atmosphere, 6.3 mL of molten hexadecylamine and 150 nmoles of ZnSe cores in hexane (from above) were added. The flask was held under vacuum until all volatile solvents were removed. This mixture was heated to 255° C. When the solution reached 255° C., 2.2 mL of a mixture of 0.186 g Et$_2$Zn, 0.717 mL CYANEX 272, and 5.155 mL trioctylphosphine (0.55 mmol Zn), and 1.1 mL a mixture of 0.269 g bis(trimethylsilyl) sulfide ((TMS)$_2$S) and 2.243 g trioctylphosphine (0.55 mmol S) were added sequentially over 87 minutes. The number and duration of the sequences were determined by calculating the moles of zinc and sulfur atoms required to deliver four monolayers of ZnS; each 3 angstroms (0.3 nm) thick. Each sequence started with zinc. When precursor addition was completed, the mixture was cooled to 100° C. and 9.8 mL of toluene was added. After the toluene addition, the mixture was allowed to cool to room temperature. The final material had an emission maximum wavelength of 422 nm and a FWHM 19 nm. The quantum yield of this material in organic solvent was measured in a mixture of 25% TOP and 75% 2-methyl-THF. TOP is a good oxygen scavenger and is required when measuring the quantum yield of oxygen sensitive materials. The quantum yield in the above organic solvent was 31%. When the material was redispersed in a mixture of 95% 50 mM borate solution and 5% 2-mercaptoethanol with a hydrophobically modified hydrophilic polymer, the quantum yield was 20% (Example 11). The water dispersible particles dispersed in a solution of 50 mM borate lost 75% of their initial emission intensity after 3 min of constant illumination. The average diameter as measured by TEM for fifty particles was 8.3 nm with a standard deviation of 1 nm.

Example 6

Coating with Zinc Sulfide Shell

Immediately following the 20 minute hold time at the end of the Example 3, 1.922 mL of a mixture of 0.925 g Et$_2$Zn, 3.57 mL CYANEX 272 and 25.65 mL trioctylphosphine (0.48 mmol Zn), and 0.961 mL of a mixture of 0.128 g (TMS)$_2$S and 1.072 g trioctylphosphine (0.48 mmol of S) are added sequentially over 96 minutes. The number and duration of the sequences were determined by calculating the moles of zinc and sulfur atoms required to deliver four monolayers of ZnS each 3 angstroms (0.3 nm) thick. Each sequence started with zinc. When precursor addition was completed, the mixture was cooled to 100° C. and 9.6 mL of toluene was added. After toluene addition, the mixture was allowed to cool to room temperature. The final material had an emission maximum wavelength of 525 nm and a FWHM 44 nm.

Example 7

Coating with Zinc Sulfide Shell

Immediately following the 20 minute hold time at the end of the Example 4, 2.2 mL of a mixture of 0.167 g Et$_2$Zn, 0.645 mL CYANEX 272 and 4.639 mL trioctylphosphine (0.55 mmol Zn), was mixed with 0.22 mL of a mixture of 0.269 g Me$_2$Cd (0.055 mmol Cd), 0.896 mL of CYANEX 272 and 6.505 mL of trioctylphosphine and added sequentially with 1.1 mL of a mixture of 0.269 g (TMS)$_2$S and 2.243 g trioctylphosphine (0.55 mmol of S) over 96 minutes. The number and duration of the sequences were determined by calculating the moles of zinc and sulfur atoms required to deliver four monolayers of ZnS each 3 angstroms (0.3 nm) thick. Each sequence started with zinc. When precursor addition was completed, the mixture was cooled to 100° C. and 9.8 mL of toluene was added. After toluene addition, the mixture was allowed to cool to room temperature. The final material had an emission maximum wavelength of 519 nm and a FWHM 48 nm. The organic quantum yield in hexane was 47%. The quantum yield of the particles dispersed in 50 mM borate with a hydrophobically modified hydrophilic polymer was 42% (Example 11). The organic particles dispersed in hexane lost 40% of their initial emission intensity after 3 min of constant illumination (FIG. 6). The water dispersible particles in a solution of 50 mM borate lost 28% of their initial emission intensity after 3 min of constant illumination (FIG. 7).

Example 8

Treatment with Magnesium

To a 50 mL round-bottom flask, 857.8 mg magnesium acetate hydrate, 5.07 mL CYANEX 272, and 14.34 mL trioctylphosphine were added. Under a sweeping flow of nitrogen, the mixture was heated to 250° C. then immediately cooled back to room temperature. Next, 4 mL of isopropyl alcohol and 12 mL of methanol were added to 15.9 mL of core-shells from Example 6. The cloudy solution was thoroughly mixed and centrifuged at 3000 rpm for 10 minutes. The supernatant was discarded and 15.9 mL of hexane was added to redissolve the pellet. White insoluble solids were removed by centrifugation to yield a clear, colored dispersion of nanocrystals. The particles were further precipitated as before and redispersed in the magnesium solution from above. Once the pellet was completely dispersed in the magnesium solution, the mixture was degassed at room temperature under vacuum. Finally, the mixture was heated to 180° C. and held there for 1 hour. After the 1 hour hold time, the mixture was cooled to room temperature. The final material had an emission maximum wavelength of 520 nm and a FWHM 41 nm. The organic quantum yield in hexane was 59%. The quantum yield of the particles dispersed in 50 mM borate with a hydrophobically modified hydrophilic polymer was 50% (Example 11).

Example 9

Treatment with Magnesium

Figure 14:
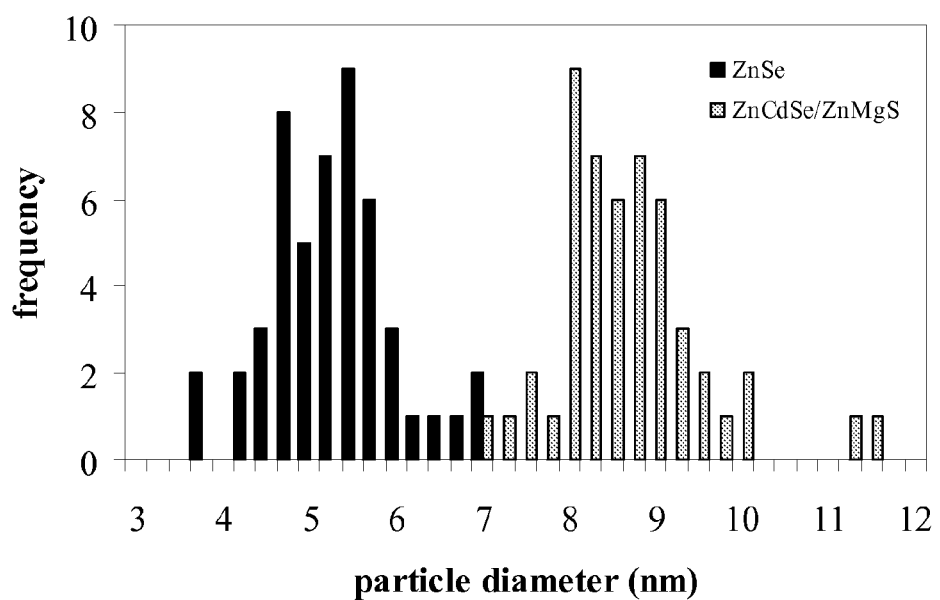
FIG. 14 shows the particle diameters measured by transmission electron microscopy of ZnSe core versus ZnCdSe/ZnMgS core/shell. The ZnSe cores appear to have an average size of about 5 nm, and the ZnCdSe core with a ZnMgS shell has a diameter of between 8 and 9 nm, so the shell adds 3-4 nm to the diameter of the nanocrystal.

To a 50 mL round-bottom flask, 646.5 mg magnesium acetate hydrate, 3.82 mL CYANEX 272, and 10.81 mL trioctylphosphine were added. Under a sweeping flow of nitrogen, the mixture was heated to 250° C. then immediately cooled back to room temperature. Next, 2.5 mL of isopropyl alcohol and 7.5 mL of methanol were added to 10 mL of core-shells from Example 7. The cloudy solution was thoroughly mixed and centrifuged at 3000 rpm for 10 minutes. The supernatant was discarded and 10 mL of hexane was added to redissolve the pellet. White insoluble solids were removed by centrifugation to yield a clear, colored dispersion of nanocrystals. The particles were further precipitated as before and redispersed in the magnesium solution from above. Once the pellet was completely dispersed in the magnesium solution, the mixture was degassed at room temperature under vacuum. Finally, the mixture was heated to 180° C. and held there for 1 hour. After the 1 hour hold time, the mixture was cooled to room temperature. The final material had an emission maximum wavelength of 515 nm and a FWHM 39 nm. The quantum yield of the organic particles dispersed in hexane was 67%. When the material was redispersed in 50 mM borate solution with a hydrophobically modified hydrophilic polymer, the quantum yield was 51%. The organic particles dispersed in hexane lost 4% of their initial emission intensity after 3 min of constant illumination (FIG. 6). The water dispersible particles dispersed in a solution of 50 mM borate lost 4% of their initial emission intensity after 3 min of constant illumination (FIG. 7). The average diameter as measured by TEM for fifty particles was 8.5 nm with a standard deviation of 0.9 nm. FIG. 14 shows a comparison of particle sizes for the ZnSe cores from Example 2 and ZnCdSe/ZnMgS core/shells prepared from this example.

Example 10

Preparation of Hydrophobically Modified Hydrophilic Polymers for Attachment to Nanocrystal Surface Hydrophobically modified hydrophilic polymers were prepared as described in U.S. Pat. No. 6,649,138 to Adams et. al., as follows.

A modified polyacrylic acid was prepared by diluting 100 g [0.48 mol COONa] of poly(acrylic acid, sodium salt) (obtained from Aldrich, molecular weight 1200) two-fold in water and acidifying in a 1.0 L round bottom flask with 150 ml (1.9 mol) of concentrated HCl. The acidified polymer solution was concentrated to dryness on a rotary evaporator (100 mbar, 80° C.). The dry polymer was evacuated for 12 hours at less than 10 mbar to ensure water removal. A stirbar and 47.0 g (0.24 mol) of 1-[3-(dimethyl-amino)-propyl]-ethylcarbodiimide hydrochloride (EDC-Aldrich 98%) were added to the flask, and the flask was then sealed and purged with $N_2$, and fit with a balloon. 500 ml of anhydrous N,N-dimethylformamide (Aldrich) was transferred under positive pressure through a cannula to this mixture; and the flask was swirled gently to dissolve the solids. 32 ml (0.19 mol) of octylamine was transferred dropwise under positive pressure through a cannula from a sealed oven-dried graduated cylinder into the stirring polymer/EDC solution, and the stirring continued for 12 hours. This solution was concentrated to <100 ml on a rotary evaporator (30 mbar, 80° C.), and the polymer was precipitated by addition of 200 ml di-$H_2O$ (de-ionized water) to the cooled concentrate, which produced a gummy white material. This material was separated from the supernatant and triturated with 100 ml di-$H_2O$ three more times. The product was dissolved into 400 ml ethyl acetate (Aldrich) with gentle heating, and basified with 200 ml di-$H_2O$ and 100 g N—N—N—N-tetramethylammonium hydroxide pentahydrate (0.55 mol) for 12 hours. The aqueous layer was removed and precipitated to a gummy white product with 400 ml of 1.27 M HCl. The product was decanted and triturated with 100 ml of di-$H_2O$ twice more, after which the aqueous washings were back-extracted into 6×100 mL portions of ethyl acetate. These ethyl acetate solutions were added to the product flask, and concentrated to dryness (100 mbar, 60° C.). The crude polymer was dissolved in 300 mL of methanol and purified in two aliquots over LH-20 (Amersham-Pharmacia-5.5 cm×60 cm column) at a 3 mL/minute flow rate. Fractions were tested by nmR for purity, and the pure fractions were pooled, while the impure fractions were re-purified on the LH-20 column. After pooling all of the pure fractions, the polymer solution was concentrated by rotary evaporation to dryness, and evacuated for 12 hours at <10 mbar. The product was a white powder (25.5 g, 45% of theoretical yield), which showed broad nmR peaks in $CD_3OD$ [δ=3.1 b (9.4), 2.3 b (9.7), 1.9 1.7 1.5 1.3 b (63.3) 0.9 bt (11.3)], and clear IR signal for both carboxylic acid (1712 cm$^{-1}$) and amide groups (1626 cm$^{-1}$, 1544 cm$^{-1}$).

Example 11

Preparation of Water-Dispersible Quantum Dots Using Hydrophobically Modified Hydrophilic Polymers The following procedure was used to provide water-dispersible nanocrystals from a number of the preceding examples. Hydrophobic quantum dots were dispersed in an aqueous solvent system using hydrophobically modified hydrophilic polymers as described in U.S. Pat. No. 6,649,138, as follows.

Twenty milliliters of 3-5 μM (3-5 nmoles) of TOPO/TOP coated core-shell nanocrystals, prepared in Examples 5, 6, 7, 8, or 9, were precipitated with 20 milliliters of methanol. The flocculate was centrifuged at 3000×g for 3 minutes to form a pellet of the nanocrystals. The supernatant was thereafter removed and 20 milliliters of methanol was again added to the particles. The particles were vortexed to loosely disperse the flocculate throughout the methanol. The flocculate was centrifuged an additional time to form a pellet of the nanocrystals. This precipitation/centrifugation step was repeated an additional time to remove any excess reactants remaining from the nanocrystal synthesis. Twenty milliliters of chloroform were added to the nanocrystal pellet to yield a freely dispersed sol.

300 milligrams of the hydrophobically modified poly (acrylic acid) was dissolved in 20 mL of chloroform. Tetrabutylammonium hydroxide (1.0 M in methanol) was added to the polymer solution to raise the solution to pH 10 (pH was measured by spotting a small aliquot of the chloroform solution on pH paper, evaporating the solvent and thereafter wetting the pH paper with distilled water). Thereafter the polymer solution was added to 20 mL of chloroform in a 250 mL round bottom flask equipped with a stir bar. The solution was stirred for 1 minute to ensure complete admixture of the polymer solution. With continued stirring the washed nanocrystal dispersion described above was added dropwise to the polymer solution. The dispersion was then stirred for two minutes to ensure complete mixing of the components and thereafter the chloroform was removed in vacuo with low heat to yield a thin film of the particle-polymer complex on the wall of the flask. Twenty milliliters of distilled water were added to the flask and swirled along the walls of the flask to aid in dispersing the particles in the aqueous medium. The dispersion was then allowed to stir overnight at room temperature. At this point the nanocrystals were freely dispersed in the aqueous medium.

Example 12

Preparation of Polyethoxylated Modified Water Dispersible Quantum Dots

Water dispersible quantum dots from Example 11 are mixed with a 7000 fold molar excess of polyethylene glycol (PEG) molecules. PEG molecules or mixtures of PEG molecules ranging in molecular weight from 200 to 20,000 Da and having various functionalities such as methoxy, hydroxyl, amine, carboxy, phosphate, thiol, azido, NHS ester, aldehyde, isocyanate, and biotin can be used. Next, a 3000 fold molar excess of EDC was added and the mixture was stirred for two hours. Excess PEG and EDC were removed by ultrafiltration. The quantum yield of polyethoxylated, water dispersible nanocrystals from Example 8 was 37%. The quantum yield of polyethoxylated, water dispersible nanocrystals from Example 9 was 50%.

Example 13

Preparation of Quantum Dot Streptavidin Conjugates

To polyethoxylated modified water dispersible quantum dots from Example 12, a 100 fold molar excess of Bis(Sulfosuccinimidyl)suberate (BS$^3$) was added and gently mix for 30 minutes. Excess BS$^3$ was removed via purified over an Illustra™ NAP-5 column (GE Healthcare). Purified BS$^3$ activated particles from the NAP-5 column were mixed with a 40 fold molar excess or streptavidin and allowed to incubate at room temperature for 2 hours. Remaining unreacted BS$^3$ was quenched with a 1 M solution of glycine. A certain volume of 1 M glycine solution was added to the streptavidin conjugated particles such that the solution contained 50 millimoles of glycine per liter of solution. The conjugates were purified from excess glycine by ultrafiltration. The quantum yield of a streptavidin conjugate from core shell from Example 9 was 38%. The brightness of these streptavidin conjugates was compared to a commercially available CdSe core based streptavidin conjugate in an ELISA assay (FIG. 10). The streptavidin conjugates provided by this invention were approximately 4.6 fold brighter than the commercially available nanocrystals.

Example 14

Preparation of Quantum Dot Secondary Antibody Conjugates

To polyethoxylated modified water dispersible quantum dots from Example 12, a 130 fold molar excess of Succinimidyl-4-(N-maleimidomethyl)cyclohexane-1-carboxylate (SMCC) was added. This solution was gently mixed and incubated at room temperature for 1 hour. SMCC activated quantum dots were purified from excess SMCC over an illustra NAP-25 column. In a second reaction container, 0.35 mg of Fab or F(ab')2 antibody fragments per nanomole of polyethoxylated particles were mixed with 4000 nanomoles of Dithiothreitol (DTT) per milligram of antibody and gently mixed for 30 minutes. DTT reduced antibody was purified from excess DTT over an illustra NAP-25 column. Activated quantum dots and reduced antibody were mixed and allowed to incubate at room temperature for 2 hours. Remaining unreacted SMCC was quenched by incubating conjugates for 30 minutes with a 45 fold molar excess of 2-mercaptoethanol. Antibody conjugates were purified by fast protein liquid chromatography (FPLC). The quantum yield of a goat anti-rabbit conjugate from a core-shell from example 8 was 31%. The brightness of these antibody conjugates was compared to a commercially available CdSe core based antibody conjugate in an ELISA assay (FIG. 11). The antibody conjugates provided by this invention were approximately 4.5 fold brighter than the commercially available nanocrystals. Additionally, the brightness of these antibody conjugates was compared to a commercially available CdSe core based antibody conjugate in a cellular labeling application (FIG. 12). The antibody conjugates provided by this invention were approximately 2 to 3 fold brighter than the commercially available nanocrystals depending on the excitation wavelength.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

Example 14

Relative Photostability Experimental Tests

Photostability experiments were performed on both hydrophobic and hydrophilic nanoparticles. If hydrophobic nanoparticles were tested, then hexane was used to dilute the sample and reference material and to adjust the optical densities to be equivalent. If hydrophilic nanoparticles were tested then 50 mM borate buffer was used to dilute the sample and reference materials and to adjust the optical densities to be equivalent. A reference material was always used in the photostability experiments. The reference materials were generally either a non-magnesium containing nanoparticle or a commercial CdSe nanoparticle; where no other reference is identified, the core alone (with no shell) of a core/shell nanocrystal can be used as a reference standard. The experiment was performed by measuring the integrated emission intensity of the nanoparticle over time under constant illumination. The illumination source was a 375 nm emitting Shark Series Visible LED purchased from Opto Technology, Inc. running at a constant current of 48 mA.

What is claimed is:

1. A bright nanocrystal comprising a core and a shell, wherein the bright nanocrystal: a) has a characteristic fluorescence emission wavelength in the visible range, b) is photostable, and c) provides fluorescence intensity that is at least about twice the fluorescence intensity of a conventional nanocrystal having a CdSe core that is sized to have the same emission wavelength as the bright nanocrystal, wherein the core comprises ZnSe or ZnCdSe and the shell consists essentially of ZnS and MgS, wherein the amount of MgS in the shell is sufficient to increase the photostability of the nanocrystal relative to an otherwise identical nanocrystal that does not contain magnesium in its shell.

2. The bright nanocrystal of claim 1, wherein the characteristic fluorescence emission wavelength of the bright nanocrystal is between about 400 nm and about 600 nm.

3. The bright nanocrystal of claim 1, wherein the bright nanocrystal has a characteristic fluorescence emission wavelength between 450 nm and 550 nm.

4. The nanocrystal of claim 1, wherein the core comprises ZnCdSe, wherein the ratio of Zn to Cd is between about 1 and about 5.

5. The nanocrystal of claim 1, wherein the shell consists essentially of a first layer of ZnS and a second layer of MgS.

6. The nanocrystal of claim 1, wherein the shell wherein the shell consists essentially of a solid solution of ZnS and MgS.

7. The nanocrystal of claim 1, wherein the core consists essentially of ZnCdSe.

8. The nanocrystal of claim 1, wherein the core consists essentially of ZnSe.

9. The nanocrystal of claim 1, wherein the shell consists essentially of a mixture of MgS and ZnS.

10. The nanocrystal of claim 1, wherein the amount of MgS is sufficient to provide a nanocrystal that loses less than 10% of its fluorescence intensity under irradiation conditions where an otherwise identical nanocrystal that does not contain magnesium in its shell loses at least 20% of its fluorescence intensity.

11. The nanocrystal of claim 1, wherein the amount of MgS is sufficient to provide a nanocrystal that loses less than 10% of its fluorescence intensity under irradiation conditions where an otherwise identical nanocrystal that does not contain magnesium in its shell loses at least 40% of its fluorescence intensity.

12. The nanocrystal of claim 1, which comprises a $Zn_xCd_{1-x}Se$ core, where x is between 0.15 and 0.95, and a shell consisting essentially of $Mg_yZn_{1-y}S$, where y is at least about 0.1.

13. The nanocrystal of claim 12, wherein the nanocrystal has a characteristic fluorescence maximum wavelength in the blue or green portion of the visible spectrum.

14. A process for making the photostable nanocrystal of claim 1, comprising the steps of: i) providing a first core/shell nanocrystal; ii) dispersing the nanocrystal in a reaction mixture containing a magnesium material; and iii) heating the reaction mixture with the nanocrystal to a temperature of at least about 120° C.; to provide a photostable nanocrystal having better photostability than the first core/shell nanocrystal.

15. The process of claim 14, wherein the photostable nanocrystal loses less than 10% of its initial emission intensity under conditions where the first core/shell nanocrystal would lose 20% of its initial emission intensity.

16. The process of claim 14, wherein the reaction mixture comprises an alkylphosphinic acid, a trialkylphosphine, or a trialkylphosphine oxide, or a mixture of at least two of these materials.

17. The process of claim 14, wherein the photostable nanocrystal loses less than 10% of its initial emission intensity under conditions where the first core/shell nanocrystal would lose 40% of its initial emission intensity.

18. The process of claims 14, wherein the core of the first core/shell comprises ZnSe.

19. The process of claim 14, wherein the core of the first core/shell comprises ZnCdSe.

20. The process of claim 19, wherein the ratio of Zn to Cd is at least about 1.

21. The process of claim 19, wherein the amount of Cd in the core provides a core having a largest dimension of about 6 nm and a fluorescence color in the blue or green region of the visible spectrum.

22. The process of claim 19, wherein the amount of Cd in the core provides a core having a largest dimension of about 6 nm and a fluorescence emission maximum at a wavelength above 500 nm.

23. The process of claim 14, wherein the magnesium material is a magnesium alkyl carboxylate.

24. The process of claim 23, wherein the magnesium alkylcarboxylate is magnesium acetate.

25. The process of claim 14, wherein the reaction mixture comprises at least one material selected from a trialkylphosphine, a trialkylphosphine oxide, an alkylamine, and an alkylphosphinic acid.

26. The process of claim 25, wherein the reaction mixture comprises trioctylphosphine.

27. The process of claim 14, wherein the step of heating the reaction mixture with the nanocrystal comprises heating the mixture to a temperature between about 150° C. and about 250° C.

28. The process of claim 27, wherein the step of heating the reaction mixture with the nanocrystal comprises heating the mixture for between about 0.5 hr and about 4 hr.

29. The nanocrystal of claim 1, wherein the shell consists essentially of a first layer of ZnS and a second layer consisting essentially of MgS and a material selected from ZnS and CdS.

30. A bright nanocrystal comprising a core and a shell, wherein the bright nanocrystal: a) has a characteristic fluorescence emission wavelength in the visible range, b) is photostable, and c) has a quantum yield of about 40% to about 70%., wherein the core comprises ZnSe or ZnCdSe and the shell consists essentially of a mixture of ZnS and MgS, wherein the amount of MgS in the shell is sufficient to increase the photostability of the nanocrystal relative to an otherwise identical nanocrystal that does not contain magnesium in its shell.

* * * * *